(12) United States Patent
Yamamoto

(10) Patent No.: US 10,965,867 B2
(45) Date of Patent: Mar. 30, 2021

(54) DISPLAY CONTROL DEVICE AND DISPLAY CONTROL METHOD

(71) Applicant: SONY CORPORATION, Tokyo (JP)

(72) Inventor: Kouji Yamamoto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 40 days.

(21) Appl. No.: 16/077,709

(22) PCT Filed: Feb. 20, 2017

(86) PCT No.: PCT/JP2017/006074
§ 371 (c)(1),
(2) Date: Aug. 13, 2018

(87) PCT Pub. No.: WO2017/150237
PCT Pub. Date: Sep. 8, 2017

(65) Prior Publication Data
US 2019/0045116 A1     Feb. 7, 2019

(30) Foreign Application Priority Data

Mar. 3, 2016   (JP) .............................. JP2016-041437

(51) Int. Cl.
*H04N 5/232*    (2006.01)
*G09G 5/14*     (2006.01)
(Continued)

(52) U.S. Cl.
CPC ........... *H04N 5/23232* (2013.01); *G09G 3/20* (2013.01); *G09G 5/003* (2013.01); *G09G 5/14* (2013.01);
(Continued)

(58) Field of Classification Search
CPC ......... H04N 5/232935; H04N 5/23232; H04N 5/783; H04N 5/232; H04N 5/772;
(Continued)

(56) References Cited

U.S. PATENT DOCUMENTS

2005/0259172 A1    11/2005  Okawa
2010/0060752 A1*   3/2010   Tokuyama .......... G07F 17/3213
                                                           348/240.3
(Continued)

FOREIGN PATENT DOCUMENTS

AU    2004264250 A1    4/2005
BR    PI0406184 A      7/2005
(Continued)

OTHER PUBLICATIONS

International Search Report and Written Opinion of PCT Application No. PCT/JP2017/006074, dated May 16, 2017, 5 pages of English Translation and 13 pages of ISRWO.

*Primary Examiner* — Lin Ye
*Assistant Examiner* — Tuan H Le
(74) *Attorney, Agent, or Firm* — Chip Law Group

(57) ABSTRACT

The present technology relates to a display control device and a display control method that enable a user to quickly decide the frame rate of an image. In response to a predetermined situation change, special reproduction is started for displaying an image having a variable frame rate on a display device at a display rate different from the frame rate. The present technology can be applied to, for example, a digital camera or the like capable of capturing an image by changing the frame rate.

14 Claims, 16 Drawing Sheets

(51) Int. Cl.
*H04N 5/77* (2006.01)
*G09G 3/20* (2006.01)
*H04N 5/783* (2006.01)
*G09G 5/00* (2006.01)
*H04N 5/907* (2006.01)

(52) U.S. Cl.
CPC ............ *H04N 5/232* (2013.01); *H04N 5/772* (2013.01); *H04N 5/783* (2013.01); *H04N 5/907* (2013.01); *G09G 2320/06* (2013.01); *G09G 2340/0435* (2013.01); *G09G 2354/00* (2013.01)

(58) Field of Classification Search
CPC .................. G06F 3/14; G09G 2352/00; G09G 2340/0435; G09G 5/14
See application file for complete search history.

(56) References Cited

U.S. PATENT DOCUMENTS

| | | | |
|---|---|---|---|
| 2011/0164860 A1* | 7/2011 | Nakagawa | H04N 5/772 386/343 |
| 2012/0189263 A1* | 7/2012 | Kato | H04N 5/23245 386/227 |
| 2016/0364110 A1* | 12/2016 | Matsuda | G06F 3/0484 |
| 2018/0012618 A1* | 1/2018 | Narita | G11B 27/28 |

FOREIGN PATENT DOCUMENTS

| | | |
|---|---|---|
| CA | 2499413 A1 | 1/2005 |
| CN | 1701593 A | 11/2005 |
| EP | 1648163 A1 | 4/2006 |
| JP | 2005-039714 A | 2/2005 |
| KR | 10-2006-0059852 A | 6/2006 |
| KR | 10-1222727 B1 | 1/2013 |
| RU | 2005107694 A | 7/2006 |
| WO | 2005/009029 A1 | 1/2005 |

* cited by examiner

DISPLAY CONTROL DEVICE AND DISPLAY CONTROL METHOD

CROSS REFERENCE TO RELATED APPLICATIONS

This application is a U.S. National Phase of International Patent Application No. PCT/JP2017/006074 filed on Feb. 20, 2017, which claims priority benefit of Japanese Patent Application No. JP 2016-041437 filed in the Japan Patent Office on Mar. 3, 2016. Each of the above-referenced applications is hereby incorporated herein by reference in its entirety.

TECHNICAL FIELD

The present technology relates to a display control device, a display control method, and a program, and more particularly to, for example, a display control device, a display control method, and a program that enable a user to quickly decide the frame rate of an image.

BACKGROUND ART

For example, a digital camera for displaying images (moving images) on multiple windows at different frame rates has been proposed (see, for example, Patent Document 1).

CITATION LIST

Patent Document

Patent Document 1: Japanese Patent Application Laid-Open No. 2007-336522

SUMMARY OF THE INVENTION

Problems to be Solved by the Invention

In recent years, a digital camera equipped with an image sensor capable of changing the frame rate has been realized as a new digital camera. With such a digital camera, it is possible to change the frame rate and record images with various frame rates.

By the way, a user is not accustomed to the technology of changing the frame rate, and it is difficult for the user to intuitively recognize the influence of a slight change of the frame rate, such as 1 flame per second (fps), on the image, for example.

That is, for example, in a case where an image with a high frame rate (hereinafter, also referred to as a high frame rate image) is captured by changing the frame rate with a digital camera capable of changing the frame rate, this high frame rate image can be used as an image with smooth motion or as a slow motion image.

What is called a through image (live view image) is displayed on the digital camera, but with the through image, it is difficult for the user to check the impression of utilizing a high frame rate image as a slow motion image.

Therefore, before recording an image with a certain frame rate, display of what is called a preview is required for checking what kind of image the image with that frame rate is.

That is, in a case where a preview is not performed, for example, the impression of utilizing a high frame rate image as a slow motion image is grasped, for example, only after capturing (recording) the high frame rate image and performing the special reproduction of the high frame rate image as a slow motion image to view that image.

If the user does not like the impression of utilizing the high frame rate image as a slow motion image after viewing the high frame rate image, the user needs to change the frame rate and recapture a high frame rate image.

Therefore, in order to decide the optimum frame rate, the user may have to repeat the process of changing the frame rate, re-recording a high frame rate image, and viewing that image, which is troublesome.

In this regard, by displaying a preview of a slow motion image, the user can check the impression of utilizing a high frame rate image as a slow motion image by looking at the preview, and can decide the frame rate of an image for obtaining the user's desired slow motion image.

Meanwhile, as digital cameras capable of changing the frame rate become widespread in the future, requests for proposals for methods that enable a user to more quickly decide the frame rate of an image for obtaining the user's desired slow motion image are expected to increase.

The present technology has been made in view of such a situation, and an object thereof is, for example, to enable a user to quickly decide the frame rate of an image for obtaining the user's desired slow motion image or the like.

Solutions to Problems

A display control device or a program according to the present technology is a display control device including a display control unit that starts, in response to a predetermined situation change, special reproduction for displaying an image having a variable frame rate on a display device at a display rate different from the frame rate, or a program for causing a computer to function as such a display control device.

A display control method according to the present technology is a display control method including a step of starting, in response to a predetermined situation change, special reproduction for displaying an image having a variable frame rate on a display device at a display rate different from the frame rate.

In the display control device, the display control method, and the program according to the present technology, in response to a predetermined situation change, special reproduction is started for displaying an image having a variable frame rate on a display device at a display rate different from the frame rate.

Note that the display control device may be an independent device or an internal block constituting one device.

In addition, the program can be provided by being transmitted via a transmission medium, or by being recorded on a recording medium.

Effects of the Invention

According to the present technology, for example, a user can quickly decide the frame rate of an image.

Note that the effects described herein are not necessarily limited, and any of the effects described in the present disclosure may be obtained.

MODE FOR CARRYING OUT THE INVENTION

One Embodiment of Digital Camera to which Present Technology is Applied

Figure 1:
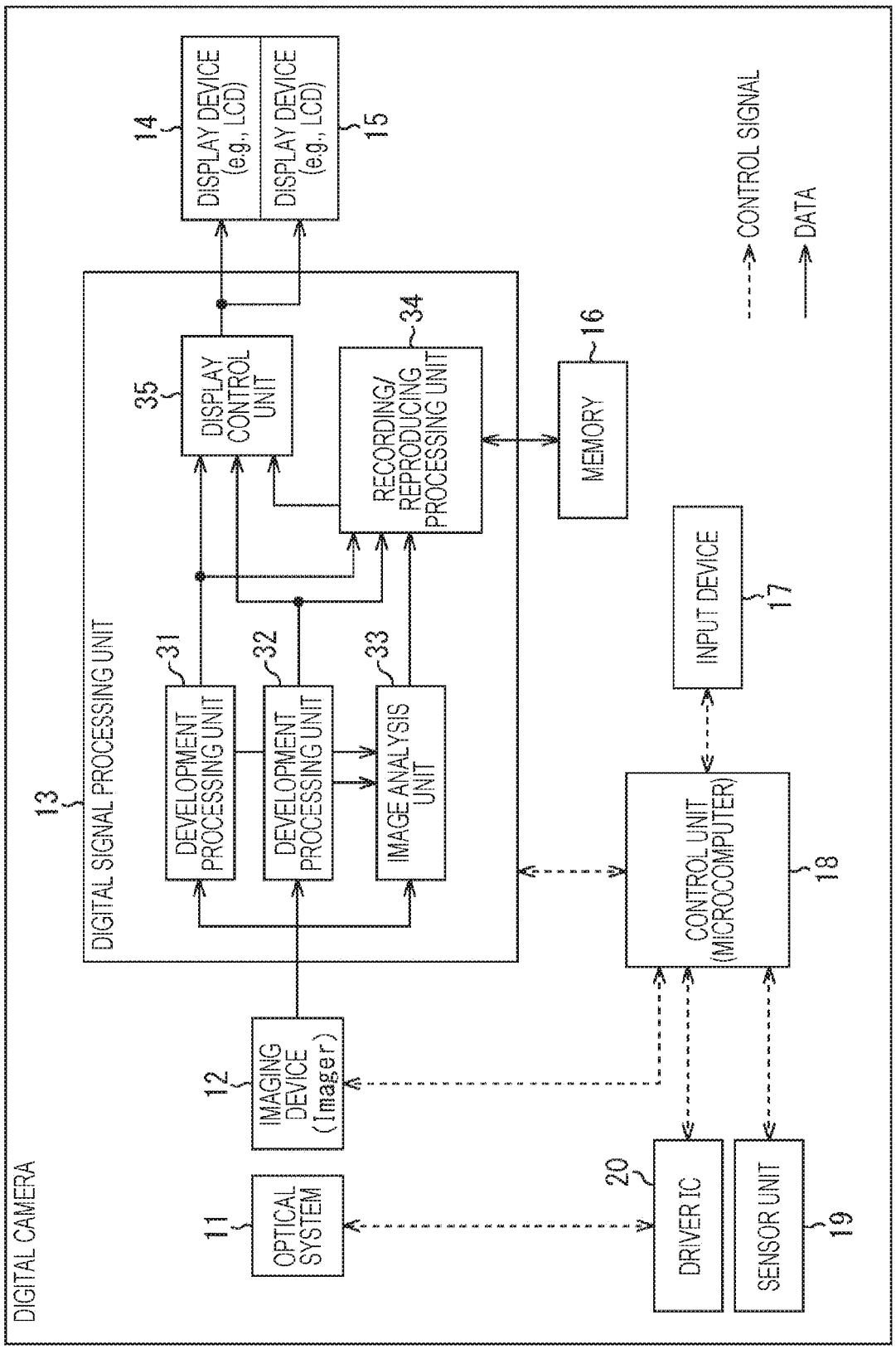
FIG. 1 is a block diagram illustrating an exemplary configuration of one embodiment of a digital camera to which the present technology is applied.

FIG. 1 is a block diagram illustrating an exemplary configuration of one embodiment of a digital camera to which the present technology is applied.

Note that the digital camera can capture both still images and moving images.

In FIG. 1, the digital camera includes an optical system 11, an imaging device 12, a digital signal processing unit 13, display devices 14 and 15, a memory 16, an input device 17, a control unit 18, a sensor unit 19, and a driver integrated circuit (IC) 20.

The optical system 11 has, for example, a zoom lens, a focus lens, a diaphragm, and the like (not illustrated), and causes external light to enter the imaging device 12.

The imaging device 12 includes, for example, a complementary metal oxide semiconductor (CMOS) image sensor, and performs imaging. That is, the imaging device 12 receives incident light from the optical system 11, performs photoelectric conversion, and obtains an image (signal) as an electric signal corresponding to incident light from the optical system 11. Then, the imaging device 12 outputs an image obtained by imaging.

Here, the imaging device 12 includes an image sensor capable of changing the frame rate of an image. For example, the imaging device 12 can seamlessly change the frame rate of an image in accordance with an instruction from the outside or the like, for example, in units of 1 frame per second (fps) or the like.

It is to be noted that the imaging device 12 can also include, for example, an image sensor capable of outputting multiple streams, that is, capable of simultaneously outputting streams of images with a plurality of frame rates, and can output one or more streams of images obtained by imaging.

For example, the imaging device 12 can perform imaging at a plurality of frame rates such as a predetermined default frame rate and a frame rate higher or lower than the default frame rate, and generate a plurality of (streams of) images having different frame rates.

In a case where the imaging device 12 includes an image sensor that outputs multiple streams, as described above, it is assumed that the frame rate of one or more images out of images with a plurality of frame rates that the image sensor can output can be changed.

The following description is based on the assumption that the imaging device 12 can perform imaging at the default frame rate and a frame rate different from the default frame rate, and output a first image with the default frame rate and a second image with the frame rate different from the default frame rate obtained by imaging.

Further, it is assumed that the imaging device 12 is capable of at least changing the frame rate of the second image.

Note that, as described above, the imaging device 12 only needs to include an image sensor capable of changing the frame rate of an image, and it is not essential for the imaging device 12 to output multiple streams (in this example, to output two streams of first and second images).

In addition, in a case where the imaging device 12 is capable of outputting multiple streams, it is possible to output not only two streams of first and second images but also three or more streams of images having different frame rates.

The first and second images output from the imaging device 12 are supplied to the digital signal processing unit 13. Note that in addition to the first and second images output from the imaging device 12, for example, a plurality of images with different frame rates downloaded from a server and a plurality of images with different frame rates reproduced from a recording medium can be supplied to the digital signal processing unit 13.

The digital signal processing unit 13 performs required signal processing on (streams of) first and second images from the imaging device 12, and supplies them to the display device 14 or 15 and the memory 16.

The digital signal processing unit 13 includes development processing units 31 and 32, an image analysis unit 33, a recording/reproducing processing unit 34, and a display control unit 35.

The first image from the imaging device 12 is supplied to the development processing unit 31. The development processing unit 31 performs development processing on the first image from the imaging device 12, and outputs the first image after development processing. The first image output by the development processing unit 31 after development processing is supplied to the recording/reproducing processing unit 34 and the display control unit 35.

Here, development processing can include the process of enhancing image quality such as noise removal in addition to the process of generating an image having data of each color constituent of red (R), green (G), and blue (B), for example, from what is called a RAW data image.

The second image from the imaging device 12 is supplied to the development processing unit 32. The development processing unit 32 performs development processing on the second image from the imaging device 12, and outputs the second image after development processing. The second image output by the development processing unit 32 after development processing is supplied to the recording/reproducing processing unit 34 and the display control unit 35.

The first and second images output from the imaging device 12 are supplied to the image analysis unit 33, and the first image output by the development processing unit 31 after development processing and the second image output by the development processing unit 32 after development processing are also supplied to the image analysis unit 33.

The image analysis unit 33 analyzes in real time the first and second images from the imaging device 12 or the first image supplied from the development processing unit 31 after development processing and the second image supplied from the development processing unit 32 after development processing. Further, the image analysis unit 33 detects event points in the first and second images on the basis of the analysis result obtained by analyzing the first and second images. The image analysis unit 33 supplies event points to the recording/reproducing processing unit 34.

As used herein, an event point is information indicating a frame in which a predetermined event has occurred, such as a scene change frame, a (start or end) frame of a highlight scene, a frame in which a predetermined subject starts to move, and a frame with a change of the facial expression of a person or another animal in the first and second images. A predetermined event can be set in advance, for example.

An event point can be tagged with the contents of the event that occurred at the event point.

The recording/reproducing processing unit 34 records or reproduces, in or from a recording (storage) medium, the first image from the development processing unit 31 and the second image from the development processing unit 32. That is, the recording/reproducing processing unit 34 encodes the first image from the development processing unit 31 and the second image from the development processing unit 32 as necessary, and records (stores) them in the memory 16. In addition, the recording/reproducing processing unit 34 reads the first and second images from the memory 16 and decodes them as necessary to reproduce the first and second images, and supplies them to the display control unit 35 and an external output terminal (not illustrated).

Note that when recording the first and second images in the memory 16, the recording/reproducing processing unit 34 can also record, in the memory 16, event points in the first and second images detected by the image analysis unit 33. Event points recorded in the memory 16 can be used, for example, to start reproducing the first and second images recorded in the memory 16 from the frames indicated by the event points, or other purposes.

The display control unit 35 performs display control to display each of the first and second images supplied from the development processing units 31 and 32 on the display device 14 or 15. Furthermore, the display control unit 35 performs display control to display images other than the first and second images, such as icons, on the display device 14 or 15.

Each of the display devices 14 and 15 includes, for example, a liquid crystal display (LCD), organic electro luminescence (EL), or the like, and displays the first image, the second image, and other images under the control of the display control unit 35.

Note that the display device 14 constitutes, for example, a display panel provided on the back of the digital camera, and the display device 15 constitutes, for example, an electric viewfinder (EVF) of the digital camera.

The memory 16 stores data such as the first and second images under the control of the recording/reproducing control unit 34.

The input device 17 is operation means that can be operated by a user. The input device 17 can include physical operation means that can be mechanically operated, such as a shutter (recording) button and a dial, and can also include virtual operation means displayed on the display device 14, such as icons serving as buttons, slide bars, and the like. Virtual operation means displayed on the display device 14 such as icons can be realized by a touch panel integrally formed with the display device 14 on which icons and the like are displayed.

The input device 17 supplies an operation signal corresponding to the user's operation to the control unit 18.

The control unit 18 includes, for example, a microcomputer, and controls each block constituting the digital camera.

That is, the control unit 18 controls the imaging device 12, the digital signal processing unit 13, the input device 17, the sensor unit 19, the driver IC 20, and the like in accordance with information obtained from the imaging device 12, an operation signal from the input device 17, information obtained from the digital signal processing unit 13, sensor information output by the sensor unit 19, information obtained from the driver IC 20, and the like.

For example, under the control of the control unit 18, the imaging device 12 captures the first image, captures the second image, changes the frame rate of the second image, and the like.

The sensor unit 19 can include, for example, a sensor that senses sound such as a microphone, a sensor that senses acceleration, a sensor that senses (measures) time, and any other sensors that sense various physical quantities. The sensor unit 19 senses a predetermined physical quantity, and outputs sensor information representing the physical quantity. Sensor information output by the sensor unit 19 is supplied to the control unit 18.

Here, the control unit 18 can supply sensor information from the sensor unit 19 to the image analysis unit 33. The image analysis unit 33 can analyze sensor information supplied via the control unit 18 in real time, and detect event points in the first and second images on the basis of the analysis result.

For example, the image analysis unit 33 can detect, as an event point in the first and second images, a (start or end) frame in which a large sound has occurred or the like on the basis of the result of sensing sound as sensor information from the sensor unit 19. In addition, for example, the image analysis unit 33 can detect, as an event point in the first and second images, a (start or end) frame in which the digital camera is panned on the basis of the result of sensing acceleration as sensor information from the sensor unit 19. Further, for example, the image analysis unit 33 can detect, as event points in the first and second images, frames at equal time intervals (periodic timings) from a certain timing or the like on the basis of the result of sensing time (elapsed time) as sensor information from the sensor unit 19.

It should be noted that an event point can be detected on the basis of both the result of analyzing the first and second images and the result of analyzing sensor information.

The driver IC 20 controls (drives) the diaphragm, focus, and zoom of the optical system 11 under the control of the control unit 18.

In the digital camera configured as described above, the imaging device 12 receives incident light from the optical system 11, and outputs the first image and the second image according to the incident light.

The first image and the second image output from the imaging device 12 are supplied to the digital signal processing unit 13.

In the digital signal processing unit 13, the development processing unit 31 applies development processing to the first image from the imaging device 12, and supplies it to the display control unit 35. In addition, the development processing unit 32 applies development processing to the second image from the imaging device 12, and supplies it to the display control unit 35. Further, the image analysis unit 33 analyzes the first and second images from the imaging device 12, and detects an event point on the basis of the analysis result. Note that an event point can also be detected from sensor information output from the sensor unit 19.

The display control unit 35 causes the display devices 14 and 15 to display the first image from the development processing unit 31 and the second image from the development processing unit 32, so that the display devices 14 and 15 display the first image and the second image as through images.

In addition, in a case where the user operates the recording button constituting the input device 17 of the digital camera, the recording/reproducing processing unit 34 of the digital signal processing unit 13 makes a record of the first image and the second image (moving images) output from the imaging device 12 (records the first image and the second image in the memory 16), for example, until the recording button is operated again.

The first and second images can be recorded as images to be subjected to normal reproduction (1×speed reproduction), or can be recorded as images to be subjected to special reproduction (slow reproduction or fast-forward reproduction). In addition, with regard to the first and second images, it is possible to record both streams of images to be normally reproduced and images to be specially reproduced.

Note that in order to simplify the explanation in the following description, attention is paid to a case where the first and second images are displayed on the display device 14, not the display device 15.

In addition, although the digital camera of FIG. 1 can capture both still images and moving images as described above, the following description is based on the assumption that moving images are captured as the first and second images, unless otherwise specified.

Examples of First and Second Images

Figure 2:
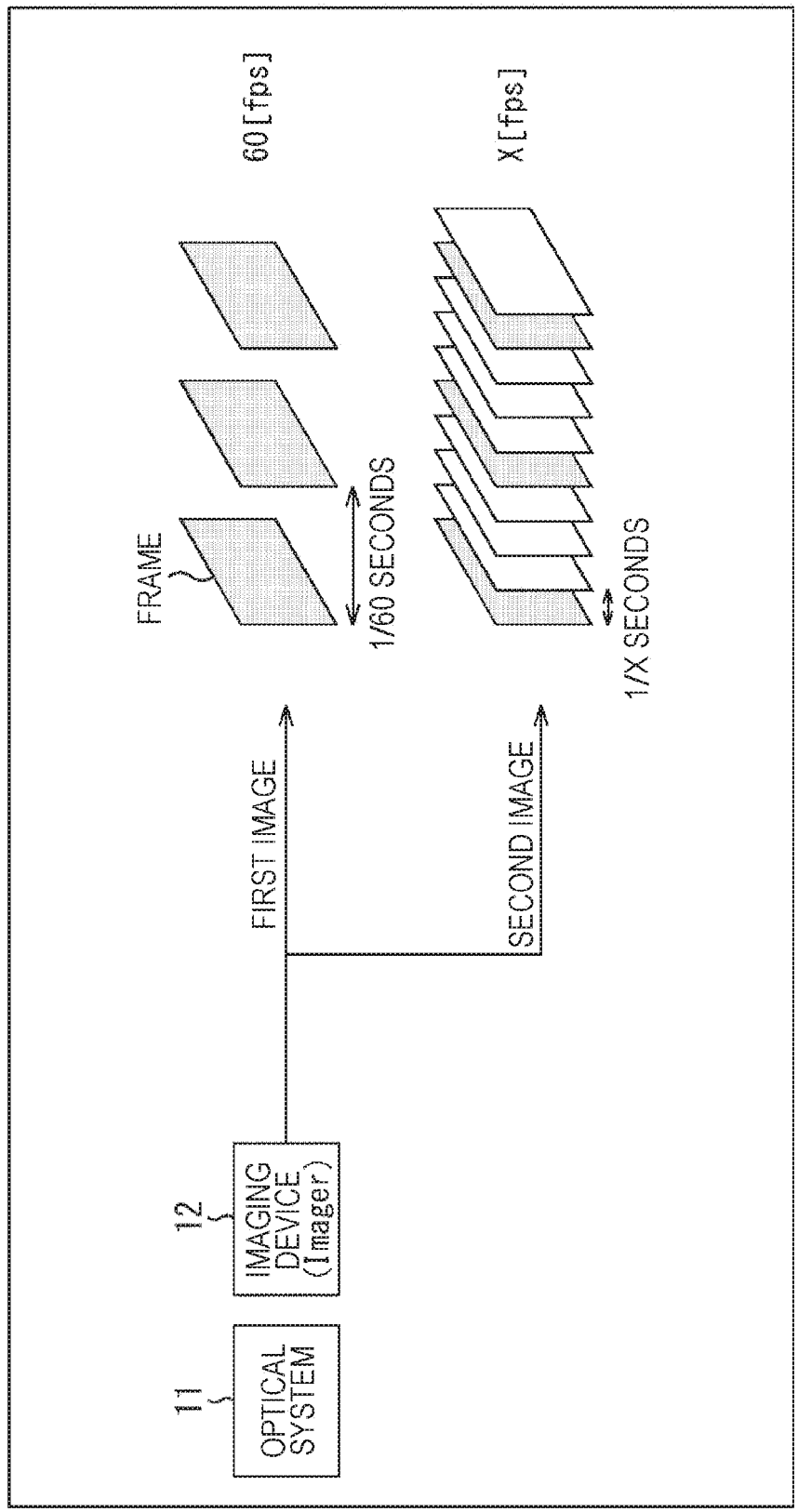
FIG. 2 is a diagram illustrating examples of first and second images output from an imaging device 12.

FIG. 2 is a diagram illustrating examples of first and second images output from the imaging device 12.

By capturing the same subject at different frame rates, the imaging device 12 can simultaneously output (streams of) first and second images of the same subject at different frame rates.

As the frame rate of the first image, for example, a predetermined default frame rate such as 60 fps can be adopted.

The frame rate of the second image can be changed to any frame rate X fps designated by the user.

Note that although 60 fps is adopted as the default frame rate in FIG. 2, the default frame rate is not limited to 60 fps.

In addition, the frame rate of the first image can be fixed to the default frame rate, or can be changed to a frame rate designated by the user in a manner similar to that for the frame rate of the second image.

In FIG. 2, the frame rate X of the second image is faster than the default frame rate (frame rate of the first image).

Here, the number of frames captured per second by the imaging device 12 is also referred to as an imaging rate, and the number of frames displayed per second on the display device 14 is also referred to as a display rate.

The frame rate of the first image or the second image means the imaging rate unless frame thinning or interpolation is performed.

In addition, in a case where an image is displayed at a display rate equal to the frame rate (imaging rate) of the image, the image is displayed in real time (real-time reproduction) (1×speed reproduction). In a case where an image is displayed at a display rate less than the frame rate of the image, the image is displayed in slow motion (slow reproduction).

Furthermore, in a case where an image is displayed at a display rate greater than the frame rate of the image, the image is displayed at fast speed (fast-forward reproduction).

As described above, in a case where an image is displayed at a display rate different from the frame rate of the image, the display of the image is special reproduction such as slow reproduction or fast-forward reproduction.

Here, displaying an image in real time at the display rate equal to the frame rate of the image is also called normal reproduction. In addition, displaying an image at a display rate different from the frame rate of the image is also called special reproduction.

In a case where the original frame rate of an image is equal to the display rate, normal reproduction is performed. If the original frame rate of an image is not equal to the display rate, normal reproduction can be performed, for example, by performing frame thinning or interpolation on the image to make the frame rate of the image equal to the display rate.

In addition, in a case where the display rate of the display device 14 is variable, normal reproduction can be performed by making the display rate of the display device 14 equal to the frame rate of an image.

Note that, as described with reference to FIG. 1, it is not essential for the imaging device 12 to output the first image, and the imaging device 12 only needs to be able to output the second image with a variable frame rate.

In addition, the digital camera of FIG. 1 can perform both recording the second image with a variable frame rate in the memory 16 at the original frame rate and recording the second image with a variable frame rate in the memory 16 after performing frame thinning or interpolation such that, for example, normal reproduction is performed in a case where the second image is displayed at the default frame rate as the display rate.

The second image recorded in the memory 16 at the original frame rate is specially reproduced by being displayed at the default frame rate as the display rate. The second image recorded in the memory 16 after frame thinning or interpolation is normally reproduced by being displayed at the default frame rate as the display rate.

Display of Through Images on Digital Camera

Figure 3:
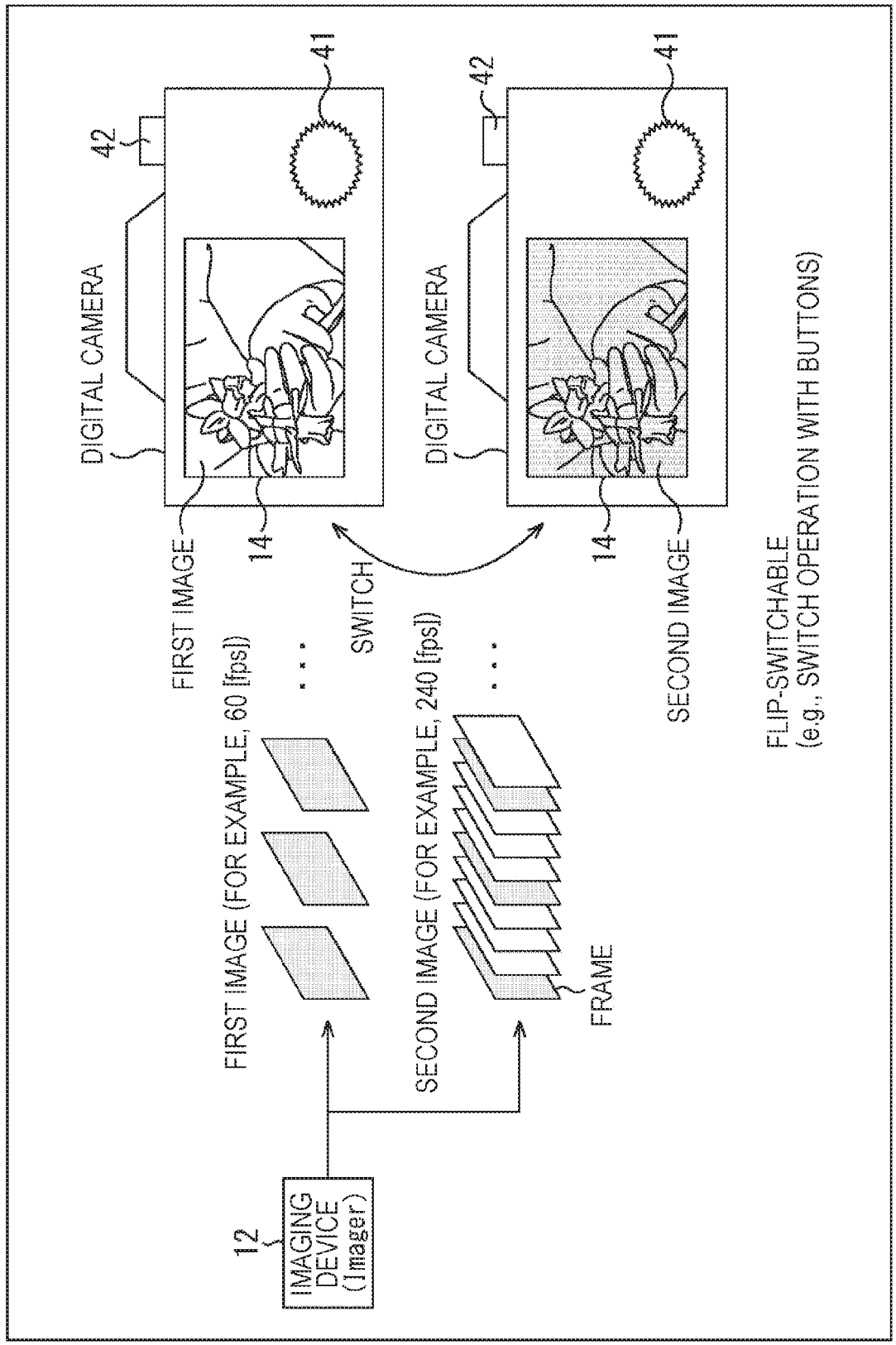
FIG. 3 is a diagram illustrating a display example of through images on the digital camera.

FIG. 3 is a diagram illustrating a display example of through images on the digital camera of FIG. 1.

In FIG. 3, the display device 14 as a display panel is provided on the back of the digital camera, and a dial 41 is provided on the lower right side of the display device 14 as the display panel. Further, a shutter (recording) button 42 is provided at the right end of the upper surface of the digital camera.

The dial 41 is rotated, for example, when changing the frame rate of the second image. The shutter button 42 is pressed when starting or finishing the recording of a moving image, when taking (recording) a still image as a photograph, or the like.

In response to the user rotating the dial 41 as a change operation for changing the frame rate of the second image, the frame rate (imaging rate) of the second image displayed on the display device 14 is changed.

That is, the frame rate of the second image captured by the imaging device 12 is increased or reduced continuously (seamlessly) in units of 1 fps or the like, for example, in accordance with the direction and amount of rotation of a rotation operation for the dial 41 as a change operation.

In FIG. 3, the first image with a frame rate of 60 fps and the second image with a frame rate of 240 fps are captured by the imaging device 12, and the first and second images are output.

In the digital camera, for example, one of the first and second images can be displayed at a predetermined position (in FIG. 3, the entire display region) in the display region of the display device 14 as a display target displayed on the display device 14.

In a case where one of the first and second images is displayed on the display device 14 as a display target, the display target image can be switched.

For example, a pressing operation for the dial 41, a tap on the display region of the display device 14, or the like can be assigned as a switching operation for switching the display target.

For example, each time the user presses the dial 41 or taps the display region of the display device 14 as a switching operation, the display control unit 35 switches the display target from the first or second image currently displayed on the display device 14 to the other image, and displays the switched display target at a predetermined position in the display region of the display device 14.

Now, assuming that flip switching means the process of replacing a certain image with another image by displaying the new image at the same position as the previous image, flip switching is performed on the first and second images in FIG. 3.

In flip switching, since the identical subjects in the first and second images are displayed at the same position, it is possible to easily grasp the difference in quality between the first and second images having different frame rates, that is, for example, to what extent the S/N of the second image with 240 fpf is worse than that of the first image with 60 fps.

Here, in a case where the first and second images are displayed by flip switching, normal reproduction is performed for the first image, and special reproduction or normal reproduction is performed for the second image.

For example, in a case where the display rate of the display device 14 is fixed at 60 fps, the first image with 60 fps is displayed on the display device 14 as it is to be normally reproduced.

In addition, in a case where the second image with 240 fps is displayed as it is on the display device 14 having a display rate of 60 fps, the second image is slowly reproduced as special reproduction.

Furthermore, the second image with 240 fps is normally reproduced by thinning out its frames to ¼ and displaying the second image on the display device 14 having a display rate of 60 fps.

Whether to perform special reproduction or normal reproduction for the second image with 240 fps can be set, for example, according to the user's operation for the input device 17.

Note that one of the first and second images can be displayed as a display target, or both the first and second images can be designated as display targets, and the first and second images can be superimposed for display.

In a case where the first and second images are superimposed for display, for example, when the first image with 60 fps and the second image with 240 fps are displayed as they are (without thinning or interpolation) on the display device 14 having a display rate of 60 fps, the first image with 60 fps is normally reproduced and the second image with 240 fps is reproduced slowly as special reproduction.

In addition, for example, when the first image with 60 fps is displayed as it is on the display device 14 and the second image with 240 fps is displayed on the display device 14 with its frames thinned out to ¼, both the first image with 60 fps and the thinned second image are normally reproduced.

Note that, for example, any one operation can be adopted as a change operation for changing the frame rate of the second image in addition to a rotation operation for the dial 41.

Here, "one operation" means a predetermined operation that can be performed directly, i.e., without going through another operation.

For example, in a case where a certain item is selected, if it is necessary to perform the operation of displaying a menu and the operation of selecting a certain item from the menu displayed through that operation, the operation of selecting a certain item does not correspond to "one operation". This is because it is necessary to go through the operation of displaying a menu in order to perform the operation of selecting a certain item.

In the present embodiment, the dial 41 is exposed on the back of the digital camera, and the frame rate of the second image is changed by rotating the dial 41. Therefore, a rotation operation for the dial 41 corresponds to one operation.

As described above, by adopting a rotation operation for the dial 41, which is one operation, as a change operation, the user can perform a change operation as soon as the user thinks of it to change the frame rate of the second image so as to check the quality of the second image with the changed frame rate.

Note that since the dial 41 is exposed on the back of the digital camera, for example, in a case where the user is holding the digital camera in order to photograph something, the user can perform a rotation operation for the dial 41 as a change operation without changing how to hold the digital camera greatly.

The above point is also applied to a switching operation for switching the display target.

That is, any one operation can be adopted as a switching operation in addition to a pressing operation for the dial 41 and a tap on the display region of the display device 14.

By adopting a pressing operation for the dial 41 or a tap on the display region of the display device 14, which is one operation, as a switching operation, the user can perform a switching operation as soon as the user thinks of it to immediately switch the display on the display device 14 from one of the first and second images to the other image so as to check the difference in quality between the first and second images.

Note that, in FIG. 3, the frame rate of the second image displayed as a display target on the display device 14 is changed in response to a change operation. However, in a case where the first image is displayed as a display target on the display device 14, for example, the frame rate of the first image as a display target can be changed, or the display target can be switched from the first image to the second image having the same frame rate as the first image, and the frame rate of the second image as the changed display target can be changed.

Figure 4:
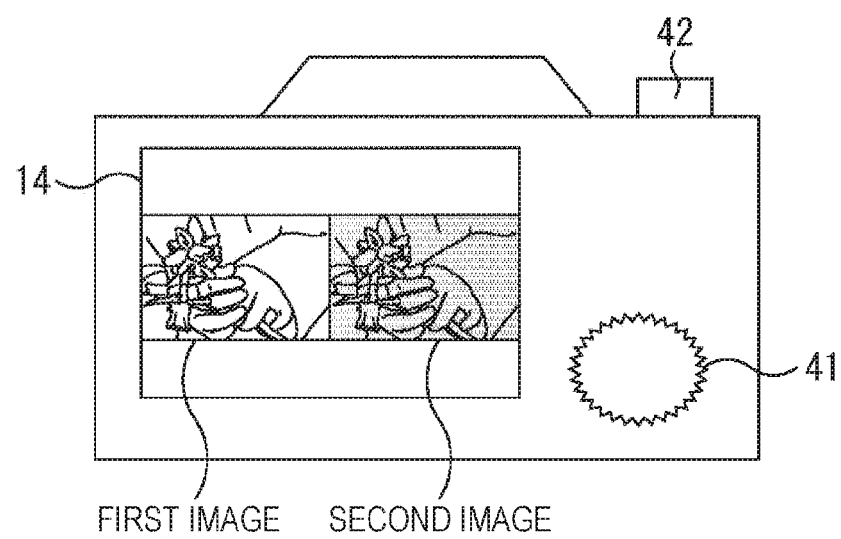
FIG. 4 is a diagram illustrating another display example of through images on the digital camera.

FIG. 4 is a diagram illustrating another display example of through images on the digital camera of FIG. 1.

Note that, in the figure, a component corresponding to that in FIG. 3 is denoted by the same reference sign, and the description thereof is appropriately omitted below.

In FIG. 4, the first and second images are simultaneously displayed side by side on the display device 14.

As described above, in a case where the first and second images are displayed side by side on the display device 14, it is possible to simultaneously check the first and second images. However, since it is necessary to divide the display region of the display device 14 into two small regions, the size of the first and second images for display is reduced.

Exemplary Process by Digital Camera

Figure 5:
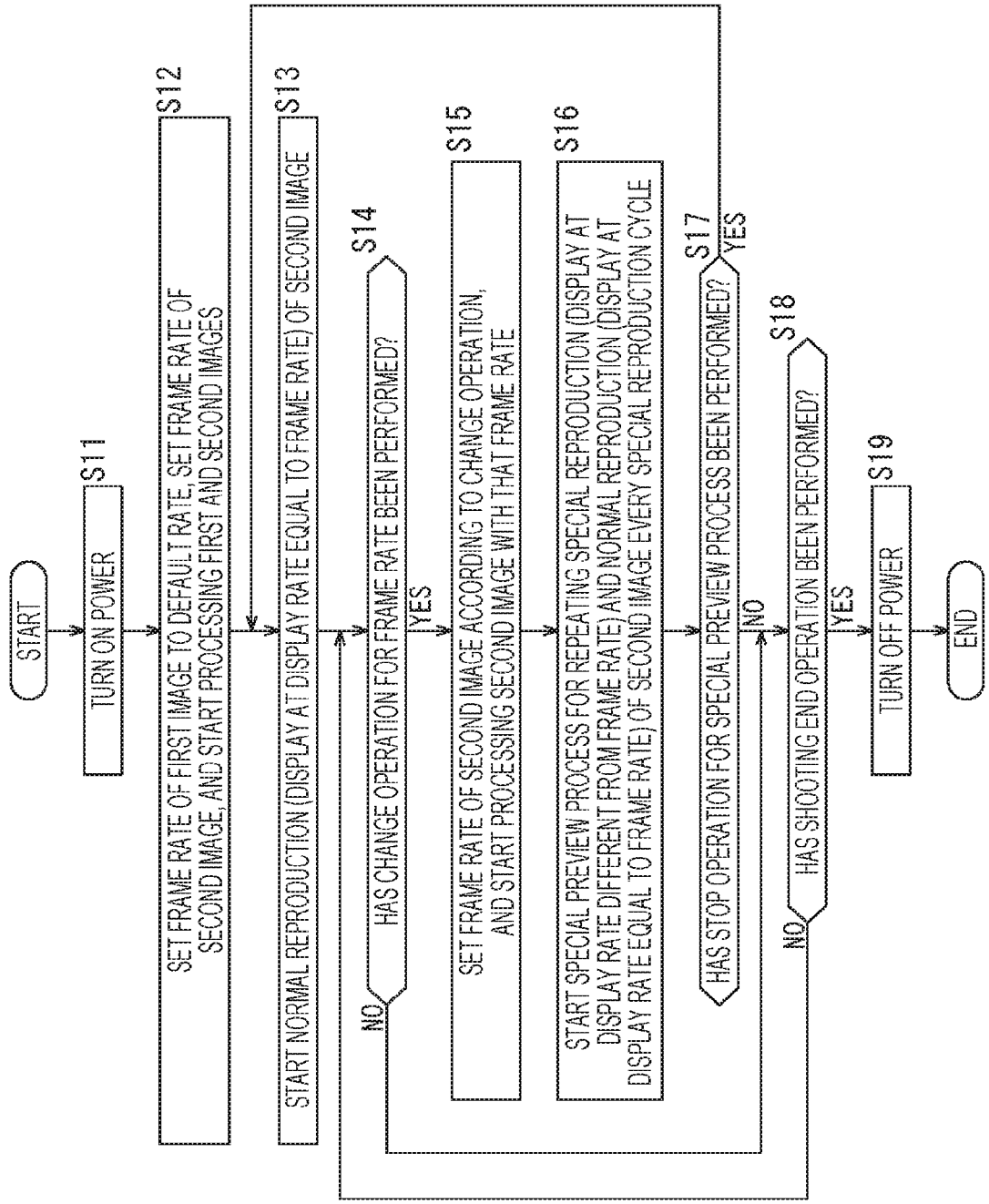
FIG. 5 is a flowchart for explaining an exemplary process by the digital camera.

FIG. 5 is a flowchart for explaining an exemplary process by the digital camera of FIG. 1.

In step S11, after the user operates the input device 17 to turn on the power, the control unit 18 turns on the power of the digital camera, and the process proceeds to step S12.

In step S12, the control unit 18 sets the frame rate (imaging rate) of the first image to the default frame rate, and controls the imaging device 12 such that the imaging device 12 outputs the first image with the default frame rate.

Further, the control unit 18 sets the frame rate of the second image, and controls the imaging device 12 such that the imaging device 12 outputs the second image with that frame rate.

The imaging device 12 starts outputting the first and second images with the frame rates designated under the control of the control unit 18, and the digital signal processing unit 13 starts processing the first and second images.

Here, for example, the default frame rate can be adopted as the frame rate of the second image immediately after the power is turned on as in the case of the first image. In addition, for example, the frame rate of the second image can be stored in the last session immediately before the power is turned off, and that frame rate can be adopted as the frame rate of the second image immediately after the power is turned on.

Note that, as described with reference to FIG. 1, the first image is not essential. In addition, in order to simplify the explanation, the following description is based on the assumption that at least the second image having a variable frame rate is designated as a display target displayed on the display device 14.

Once the processing of the first and second images is started, the process proceeds from step S12 to step S13.

In step S13, the display control unit 35 of the digital signal processing unit 13 starts the normal reproduction of the second image, that is, starts the display process for displaying the second image on the display device 14 at the display rate of the display device 14 equal to the frame rate of the second image.

Thereafter, the process proceeds from step S13 to step S14, where the control unit 18 determines whether the user has performed a change operation for changing the frame rate (imaging rate) of the image as an operation for the input device 17.

In a case where it is determined in step S14 that no change operation has been performed, the process skips steps S15 to S17 and proceeds to step S18.

In contrast, in a case where it is determined in step S14 that a change operation has been performed, the process proceeds to step S15.

In step S15, the control unit 18 sets (changes) the frame rate (imaging rate) of the second image according to the change operation, and controls the imaging device 12 such that the imaging device 12 outputs the second image with the frame rate designated by the change operation.

Under the control of the control unit 18, the imaging device 12 starts outputting the second image with the frame rate designated by the change operation, and the digital signal processing unit 13 starts processing the second image.

As described above, once the processing of the second image is started, the process proceeds from step S15 to step S16.

In step S16, the display control unit 35 of the digital signal processing unit 13 starts a special preview process for repeating the special reproduction and the normal reproduction of the second image with the frame rate designated by the change operation every predetermined special reproduction cycle.

Here, in the special reproduction of the second image, for example, the second image with its original frame rate (imaging rate) is displayed using the default frame rate as the display rate. For example, in a case where the frame rate of the second image is 240 fps and the default frame rate as the display rate of the display device 14 is 60 fps smaller than the frame rate of the second image, the second image is slowly reproduced.

In the normal reproduction of the second image, for example, frames of the second image are thinned out or interpolated such that the frame rate of the second image becomes equal to the display rate that is the default frame rate, and the second image is displayed in this state. For example, in a case where the frame rate of the second image is 240 fps and the default frame rate as the display rate of the display device 14 is 60 fps smaller than the frame rate of the second image, the second image is displayed with its frames thinned out to ¼.

After starting the special preview process in step S16, the process proceeds to step S17, where the control unit 18 determines whether the user has performed a stop operation for stopping the special preview process started in step S16 as an operation for the input device 17.

In a case where it is determined in step S17 that a stop operation has been performed, the special preview process is finished, and the process returns to step S13. Therefore, in this case, the normal reproduction of the second image (display process for displaying the second image on the display device 14 at the display rate of the display device 14 equal to the frame rate of the second image) is started again.

On the other hand, in a case where it is determined in step S17 that a stop operation has not been performed, the process proceeds to step S18, where the control unit 18 determines whether the user has performed a shooting end operation for finishing shooting with the digital camera as an operation for the input device 17.

In a case where it is determined in step S18 that a shooting end operation has not been performed, the process returns to step S14, and a similar process is repeated thereafter.

In contrast, in a case where it is determined in step S18 that a shooting end operation has been performed, the process proceeds to step S19.

In step S19, the control unit 18 turns off the power of the digital camera, and finishes the process.

As described above, according to the process defined by the flowchart of FIG. 5, once a change operation for the frame rate of the second image is performed, the special preview process is started, and the special reproduction and the normal reproduction of the second image are repeated every predetermined special reproduction cycle.

That is, for example, slow reproduction is periodically repeated as the special reproduction of the second image with the changed frame rate.

Therefore, in response to a change of the frame rate of the second image, the timing of changing the frame rate is set as the start timing of the display of a preview for checking special reproduction, and slow reproduction is immediately started as the special reproduction of the second image.

Thereafter, slow reproduction is periodically repeated as the special reproduction of the second image.

As a result, the user can check whether the second image with the frame rate changed by the change operation is the user's desired slow motion image immediately after the change operation, and decide the frame rate of the second image for obtaining the user's desired slow motion image more quickly.

As described above, by setting the start timing of the display of a preview for checking special reproduction to an appropriate timing such as the timing of changing the frame rate, the frame rate of the second image for obtaining the user's desired slow motion image can be decided more quickly.

Here, the display control unit 35 can start the special reproduction of the second image having a variable frame rate in response to a predetermined situation change in addition to a change of the frame rate of the second image.

Among various situation changes, a predetermined situation change that functions as a trigger to cause the display control unit 35 to start the special reproduction of the second image is hereinafter also referred to as a start event, as appropriate. A change of the frame rate of the second image is a kind of start event.

Capturing and Displaying Second Image in Special Preview Process

Figure 6:
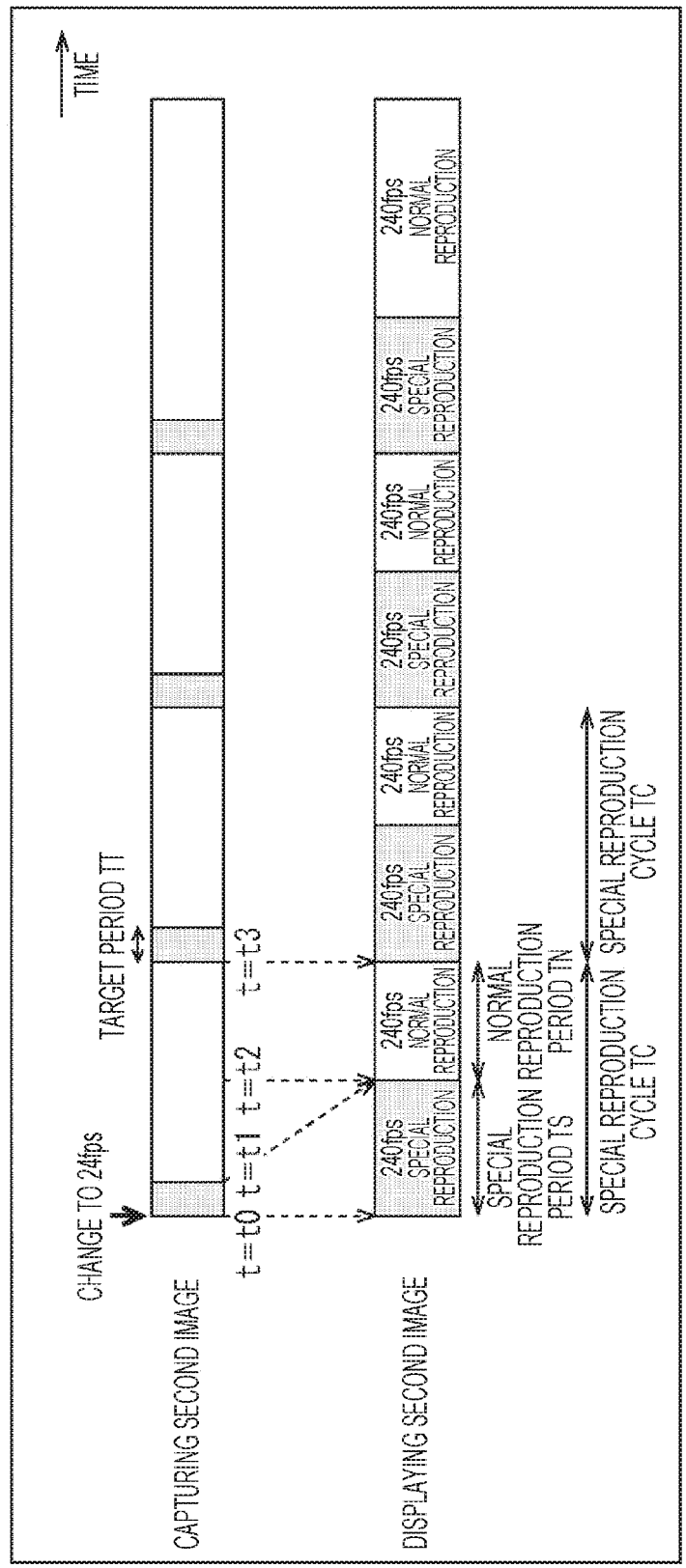
FIG. 6 is a timing chart for explaining a first example of the timing of capturing and displaying the second image in a special preview process.

FIG. 6 is a timing chart for explaining a first example of the timing of capturing and displaying the second image in the special preview process.

Here, in order to simplify the explanation, the following description is based on the assumption that, for example, the frame rate of the second image is larger than the display rate, so that slow reproduction is performed as the special reproduction of the second image.

In the special preview process, the special reproduction of the second image is periodically repeated, so that previews for checking the specially reproduced second image are displayed at regular intervals.

Hereinafter, a period in which one special reproduction is performed is referred to as a special reproduction period TS, and a cycle in the special preview process for periodically performing the special reproduction for the special reproduction period TS is referred to as a special reproduction cycle TC. A time equal to or longer than the special reproduction period TS is set as the special reproduction cycle TC.

In the special preview process, the period other than the special reproduction period TS within one special reproduction cycle TC is set as a normal reproduction period TN, and the normal reproduction of the second image is performed in the normal reproduction period TN.

Here, a period of the second image to be subjected to special reproduction in the special reproduction period TS is referred to as a target period TT.

In a case where the frame rate of the second image is larger than the display rate, the target period TT is smaller than the special reproduction period TS. For example, in a case where the frame rate of the second image is 240 fps and the display rate is 60 fps, the target period TT is 1/4=60/240 of the special reproduction period TS.

The display control unit 35 can set the target period TT, the special reproduction period TS, and the special reproduction cycle TC, for example, according to the user's operation for the input device 17. Here, since the special reproduction cycle TC is the sum of the special reproduction period TS and the normal reproduction period TN, the special reproduction cycle TC can be set by setting the special reproduction cycle TC itself or by setting the special reproduction period TS and the normal reproduction period TN.

Note that, with respect to the target period TT and the special reproduction period TS, if one of the target period TT and the special reproduction period TS is determined, the other is also determined according to the frame rate of the second image and display rate.

Let the ratio of the frame rate X of the second image to the display rate Y be expressed as R=X/Y.

In a case where the special reproduction period TS is set, the target period TT is 1/R of the special reproduction period TS. For example, in a case where the special reproduction period TS is set to four seconds, the target period TT is 4/R seconds.

In addition, in a case where the target period TT is set, the special reproduction period TS is R times as long as the target period TT. For example, in a case where the target period TT is set to one second, the special reproduction period TS is R seconds. More specifically, for example, assuming that the display rate is 60 fps, in a case where the target period TT is set to one second, when the frame rate of the second image is 240 fps or 120 fps, the special reproduction period TS is 4=240/60 seconds or 2=120/60 seconds, respectively.

In the following description, it is assumed, for example, that the special reproduction cycle TC and the target period TT are set according to the user's operation. It is further assumed that the special reproduction period TS (=<TC) is decided according to the target period TT, and the period other than the special reproduction period TS within the special reproduction cycle TC (time that remains after the lapse of the special reproduction period TS from the beginning of the special reproduction cycle TC) is designated as the normal reproduction period TN.

In this case, the target period TT set according to the user's operation is a fixed period, but the special reproduction institution TS decided according to the target period TT and the normal reproduction period TN are variable periods that depend on the frame rate of the second image.

In FIG. 6, at time t=t0, the user performs a change operation, and the frame rate of the second image is changed (set) to 240 fps.

At time t=t0, in response to the frame rate of the second image being changed to 240 fps, slow reproduction is started as the special reproduction (hereinafter also referred to as 240-fps special reproduction) of the second image with a frame rate of 240 fps.

Time t=t1 is the time after the lapse of the target period TT from time t=t0, and the second image with a frame rate of 240 fps captured during time t=t0 to t1 is subjected to the 240-fps special reproduction starting from time t=t0.

At time t=t2 after the lapse of the special reproduction period TS from time t=t0, the slow reproduction started at time t=t0 as the 240-fps special reproduction is finished. After that, the normal reproduction period TN is started.

In the normal reproduction period TN from time t=t2, the normal reproduction (hereinafter also referred to as 240-fps normal reproduction) of the second image with a frame rate of 240 fps captured in the normal reproduction period TN is performed.

Here, for example, in a case where the first and second images are simultaneously displayed side by side on the display device 14 as illustrated in FIG. 4, the first image is displayed in real time and the second image is displayed in slow motion in the special reproduction period TS. Then, in the normal reproduction period TN, the first and second images are displayed in real time, and the same scene is displayed as the first and second images.

At time t=t3 after the lapse of the special reproduction cycle TC from time t=t0 at which the last 240-fps special reproduction was started, the 240-fps normal reproduction started at time t=t2 is finished.

Time t=t3 is the start time of a new special reproduction cycle TC, and slow reproduction is started at time t=t3 as the 240-fps special reproduction of the second image captured in the target period TT.

Thereafter, similarly, the 240-fps special reproduction and the 240-fps special reproduction of the second image with the changed frame rate of 240 fps are repeated every special reproduction cycle TC, for example, until the frame rate of the second image is changed again.

As described above, immediately after the change of the frame rate of the second image, the special reproduction of the second image captured at the changed frame rate is performed periodically. Therefore, the user can easily imagine whether the second image with a frame rate of 240 fps is the user's desired slow motion image, and can decide the frame rate of the second image quickly.

In addition, in FIG. 6, since the special reproduction and the normal reproduction of the second image are alternately performed, the user can check the second image slowly reproduced as special reproduction while comparing it with the second image normally reproduced.

Note that, as described above, since a time equal to or longer than the special reproduction period TS is set as the special reproduction cycle TC, the same time can be set as the special reproduction cycle TC and the special reproduction period TS. In a case where the special reproduction cycle TC and the special reproduction period TS are the same time, the normal reproduction period TN is zero and normal reproduction is not performed.

In a case where the normal reproduction period TN is zero, the normally reproduced second image can be substantially checked by changing the frame rate of the second image to the rate equal to the display rate or by viewing the display of the through image of the first image.

In addition, the special reproduction cycle TC, the special reproduction period TS, or the target period TT can be changed at any timing. In a case where the special reproduction cycle TC, the special reproduction period TS, or the target period TT is changed, the special preview process reflecting the changed special reproduction cycle TC, special reproduction period TS, or target period TT can be started immediately.

Furthermore, as described with reference to FIG. 5, in a case where a stop operation is performed and the special preview process is finished (step S17), the user can resume the special preview process by operating the input device 17.

Figure 7:
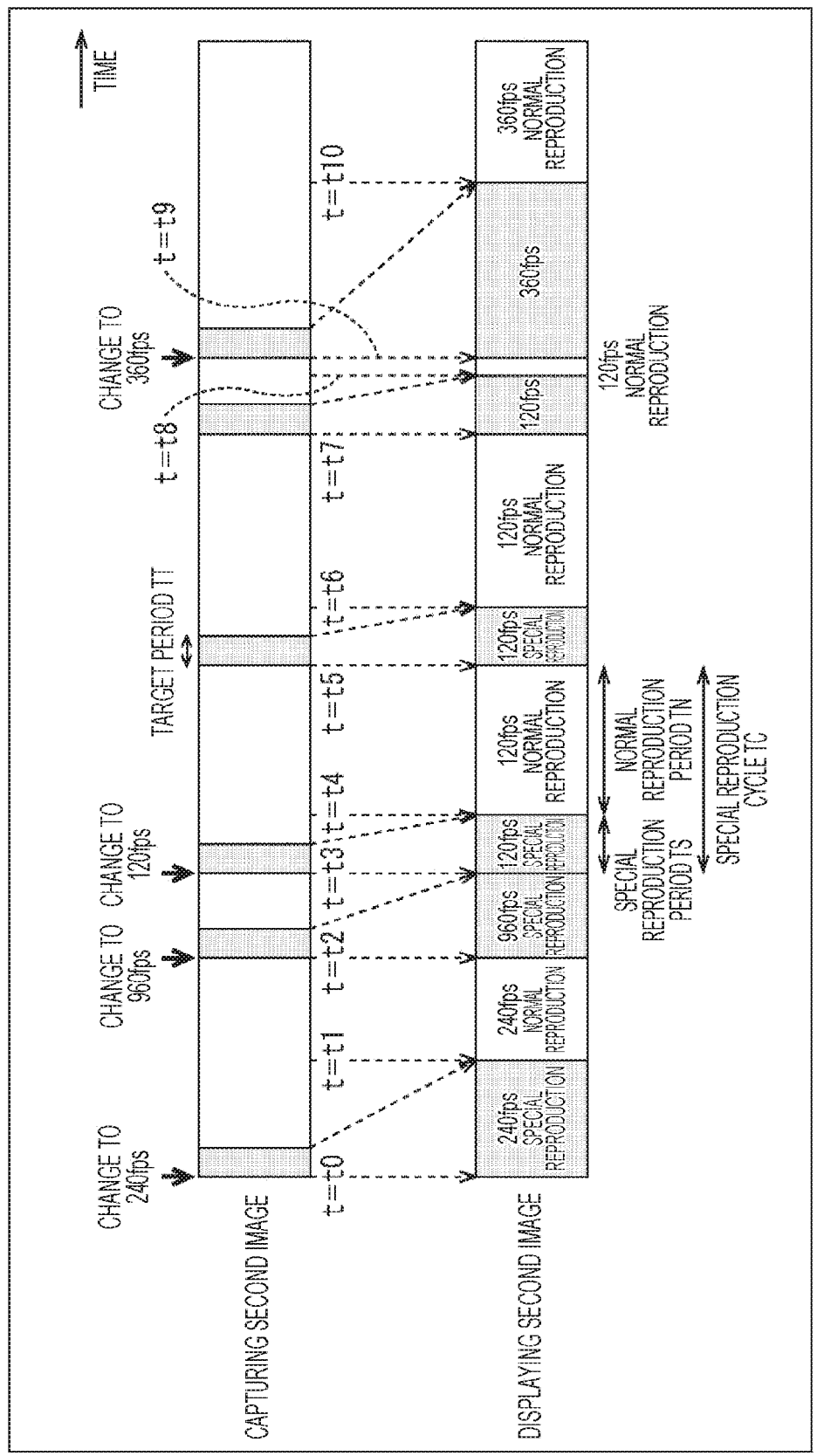
FIG. 7 is a timing chart for explaining a second example of the timing of capturing and displaying the second image in the special preview process.

FIG. 7 is a timing chart for explaining a second example of the timing of capturing and displaying the second image in the special preview process.

In FIG. 7, at time t=t0, the user performs a change operation, the frame rate of the second image is changed to 240 fps, and in response to the change of the frame rate, slow reproduction is started as the 240-fps special reproduction of the second image with a frame rate of 240 fps.

The 240-fps special reproduction started at time t=t0 is performed until the special reproduction period TS ends, and finished at time t=t1 after the lapse of the special reproduction period TS from time t=t0.

At time t1, the normal reproduction period TN is started. In the normal reproduction period TN from time t=t1, the 240-fps normal reproduction of the second image with a frame rate of 240 fps captured in the normal reproduction period TN is performed.

In FIG. 7, the user performs a change operation at time t=t2 before the lapse of the normal reproduction period TN from time t=t1, and the frame rate of the second image is changed from 240 fps to 960 fps.

At time t=t2, in response to the frame rate of the second image being changed to 960 fps, the 240-fps normal reproduction that has been performed until that time is finished. Further, time t=t2 when the frame rate was changed is set as a new start time of the special preview process, and slow reproduction is started as the 960-fps special reproduction of the second image with the changed frame rate of 960 fps.

In FIG. 7, the user performs a change operation at time t=t3 before the lapse of the special reproduction period TS from time t=t2, and the frame rate of the second image is changed from 960 fps to 120 fps.

At time t=t3, in response to the frame rate of the second image being changed to 120 fps, the 960-fps special reproduction that has been performed until that time is finished. Further, time t=t3 when the frame rate was changed is set as a new start time of the special preview process, and slow reproduction is started as the 120-fps special reproduction of the second image with the changed frame rate of 120 fps.

At time t=t4 after the lapse of the special reproduction period TS from time t=t3, the slow reproduction started at time t=t3 as the 120-fps special reproduction is finished, and thereafter the normal reproduction period TN is started.

In the normal reproduction period TN from time t=t4, the 120-fps normal reproduction of the second image with a frame rate of 120 fps captured in the normal reproduction period TN is performed.

At time t=t5 after the lapse of the special reproduction cycle TC from time t=t3 at which the last 120-fps special reproduction was started, the 120-fps normal reproduction started at time t=t4 is finished.

Time t=t5 is the start time of a new special reproduction cycle TC, and slow reproduction is started at time t=t5 as the 120-fps special reproduction of the second image captured in the target period TT.

Thereafter, in FIG. 7, the 120-fps special reproduction of the second image with a frame rate of 120 fps is performed until the special reproduction period TS ends at time t=t6, and from time t=t6, the 120-fps normal reproduction of the second image with a frame rate of 120 fps is performed until the normal reproduction period TN ends at time t=t7.

Time t=t7 is the start time of a new special reproduction cycle TC, and slow reproduction is started at time t=t7 as the 120-fps special reproduction of the second image captured in the target period TT.

Thereafter, in FIG. 7, the 120-fps special reproduction of the second image with a frame rate of 120 fps is performed until the special reproduction period TS ends at time t=t8, and the 120-fps normal reproduction of the second image with a frame rate of 120 fps is started at time t=t8.

Then, in FIG. 7, the user performs a change operation at time t=t9 before the lapse of the normal reproduction period TN from time t=t8, and the frame rate of the second image is changed from 120 fps to 360 fps.

At time t=t9, in response to the frame rate of the second image being changed to 360 fps, the 120-fps normal reproduction that has been performed until that time is finished. Further, time t=t9 when the frame rate was changed is set as a new start time of the special preview process, and slow reproduction is started as the 360-fps special reproduction of the second image with the changed frame rate of 360 fps.

Thereafter, in FIG. 7, the 360-fps special reproduction of the second image with a frame rate of 360 fps is performed until the special reproduction period TS ends at time t=t10, and the 360-fps normal reproduction of the second image with a frame rate of 360 fps is started at time t=t10.

Thereafter, similarly, the 360-fps special reproduction and the 360-fps special reproduction of the second image with a frame rate of 360 fps are repeated every special reproduction cycle TC, for example, until the frame rate of the second image is changed.

In FIG. 7, in a case where the frame rate of the second image is changed, the timing of the change of the frame rate is set as a new start time of the special preview process, and the special preview process for the second image with the changed frame rate is started immediately.

However, in a case where the frame rate of the second image is changed, the special preview process for the second image with the changed frame rate can be started after the end of the special reproduction cycle TC of the special preview process for the second image with the previous frame rate performed at the time of the change.

Figure 8:
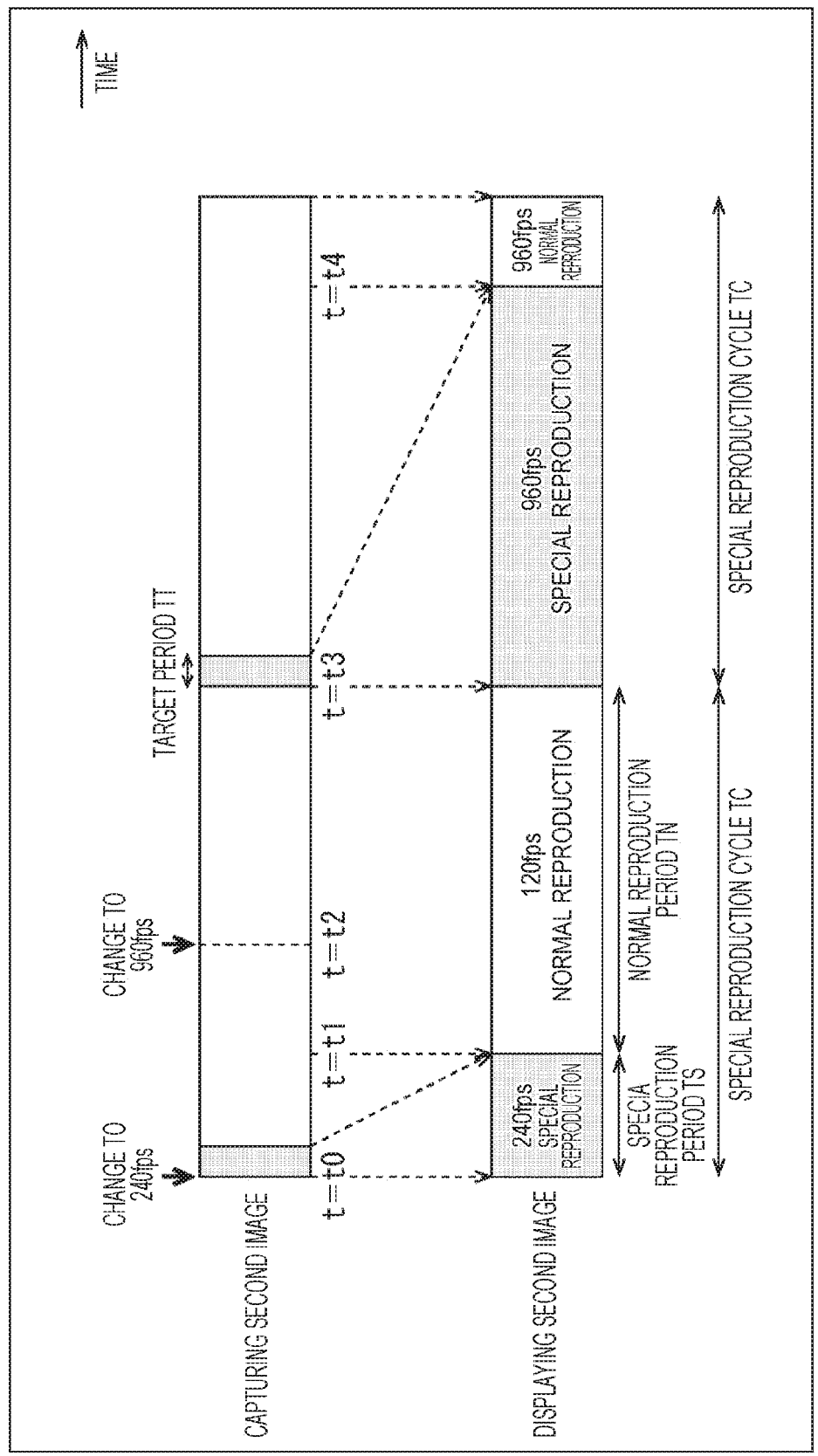
FIG. 8 is a timing chart for explaining a third example of the timing of capturing and displaying the second image in the special preview process.

FIG. 8 is a timing chart for explaining a third example of the timing of capturing and displaying the second image in the special preview process.

In FIG. 8, in a case where the frame rate of the second image is changed, the special preview process for the second image with the changed frame rate is started after the end of the special reproduction cycle TC of the special preview process for the second image with the previous frame rate performed at the time of the change.

That is, in FIG. 8, at time t=t0, the user performs a change operation, the frame rate of the second image is changed to 240 fps, and in response to the change of the frame rate, slow reproduction is started as the 240-fps special reproduction of the second image with a frame rate of 240 fps.

The 240-fps special reproduction started at time t=t0 is performed until the special reproduction period TS ends, and finished at time t=t1 after the lapse of the special reproduction period TS from time t=t0.

At time t1, the normal reproduction period TN is started. In the normal reproduction period TN from time t=t1, the 240-fps normal reproduction of the second image with a frame rate of 240 fps captured in the normal reproduction period TN is performed.

In FIG. 8, the user performs a change operation at time t=t2 before the lapse of the normal reproduction period TN from time t=t1, and the frame rate of the second image is changed from 240 fps to 960 fps.

Here, in FIG. 7, in a case where the frame rate of the second image is changed, the special reproduction of the special preview process for the second image with the changed frame rate is immediately started.

On the other hand, in FIG. 8, in a case where the frame rate of the second image is changed, the special preview process for the second image with the changed frame rate is started after the end of the special reproduction cycle TC of the special preview process for the second image performed at that time.

That is, in FIG. 8, although the frame rate of the second image is changed from 240 fps to 960 fps at time t=t2 before the lapse of the normal reproduction period TN from time t=t1, the 240-fps normal reproduction of the second image with the previous frame rate of 240 fps is continued until the end of (the special reproduction cycle TC including) the normal reproduction period TN from time t=t1.

At time t=t3 when the normal reproduction period TN from time t=t1 ends, the 240-fps normal reproduction of the second image with the previous frame rate of 240 fps is finished.

Time t=t3 when the normal reproduction period TN from time t=t1 ends is also the time when the special reproduction cycle TC of the special preview process for the second image performed at the time of changing the frame rate of the second image at time t=t2 ends.

Therefore, in FIG. 8, time t=t3 is set as a new start time of the special preview process for the second image after the change of the frame rate at time t=t2, and slow reproduction is started as the 960-fps special reproduction of the second image with the changed frame rate of 960 fps.

Then, the 960-fps special reproduction of the second image with a frame rate of 960 fps is performed until the special reproduction period TS ends at time t=t4, and the 960-fps normal reproduction of the second image with a frame rate of 960 fps is started at time t=t4.

Note that it can be set according to the user's operation for the input device 17, for example, whether to set the time of changing the frame rate as a new start time of the special preview process and immediately start the special preview process for the second image with the changed frame rate as illustrated in FIG. 7, or to start the special preview process for the second image with the changed frame rate after the end of the special reproduction cycle TC of the special preview process for the second image with the previous frame rate performed at the time of changing the frame rate as illustrated in FIG. 8.

Another Exemplary Process by Digital Camera

Figure 9:
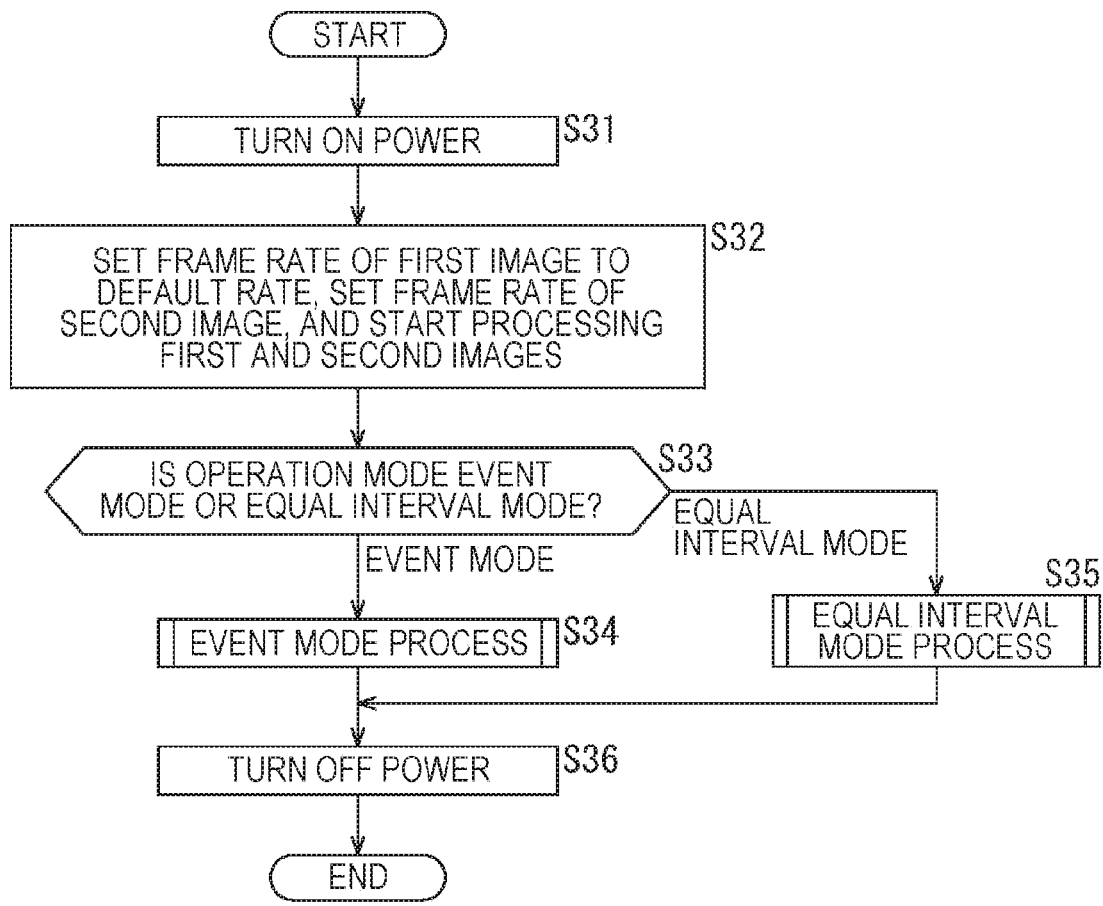
FIG. 9 is a flowchart for explaining another exemplary process by the digital camera.

FIG. 9 is a flowchart for explaining another exemplary process by the digital camera of FIG. 1.

Here, FIG. 9 shows an event mode and an equal interval mode as operation modes of the digital camera, and the operation mode is set to the event mode or equal interval mode, for example, in accordance with the user's operation for the input device 17.

In the event mode, the special reproduction of the second image is performed only for the special reproduction period TS only in a case where a predetermined situation change occurs as a start event, and thereafter normal reproduction is performed again.

In the equal interval mode, for example, the special reproduction of the second image is performed at equal intervals (periodically) by being triggered by the power of the digital camera being turned on, a change of the frame rate of the second image, or the like. That is, in the equal interval mode, for example, the special preview process is started for the second image, for example, by being triggered by the power of the digital camera being turned on, a change of the frame rate of the second image, or the like.

Further, in the equal interval mode, as in the case of the event mode, the special reproduction of the second image is performed only for the special reproduction period TS only in a case where a predetermined situation change occurs as a start event.

Here, various situation changes can be adopted as start events in addition to a change of the frame rate of the second image.

That is, a start event can be, for example, a predetermined situation change detected from the second image, a predetermined situation change detected from sensor information obtained by sensing performed by the sensor unit 19 at the time of capturing the second image, or the like.

As described with reference to FIG. 1, the digital camera can detect event points representing frames in which various events occurred, and can tag the event points with the contents of the events.

Therefore, according to the event points and tags obtained from the second image or sensor information, it is possible to recognize the timing at which the events occurred (or finished) as various situation changes and the contents of the events.

Therefore, the display control unit 35 can determine whether a start event has occurred from (the contents of) an event point and a tag obtained from the second image or sensor information, and perform the special reproduction of the second image only for the special reproduction period TS in response to the occurrence of the start event.

Only an event obtained from the second image or only an event obtained from sensor information can be adopted as the determination target of the occurrence of a start event. Alternatively, both of an event obtained from the second image and an event obtained from sensor information can be adopted as the determination targets of the occurrence of start events.

Furthermore, the currently occurring event can be analyzed from both the second image and sensor information, and the event can be designated as the determination target of the occurrence of a start event.

In addition, with regard to the determination of the occurrence of a start event, for example, the degree (probability) of occurrence of an event obtained from the second image or sensor information is digitized as an event occurrence value, and the event occurrence value is compared with a threshold value, so that whether a start event has occurred can be determined.

Further, an event (predetermined situation change) as a start event can be set according to the user's operation for the input device 17.

With regard to the setting of an event as a start event, an event can be set as a start event with an arbitrary degree of abstraction expression.

That is, for example, it is possible to set an event as a start event with what is called a low degree of abstraction expression such as a scene change. In addition, for example, it is possible to set an event as a start event with a high degree of abstraction expression such as a laughing face, a moving object, and a broken balloon.

Note that it is possible to set with what degree of abstraction expression the setting of an event as a start event is performed, for example, in accordance with the user's operation for the input device 17.

For example, the user can input an event as a start event in natural language. In this case, in the digital camera, the natural language input by the user is analyzed, and the event is recognized as a start event.

In addition, regarding an event as a start event, for example, samples of event names representing various events can be registered in the digital camera in advance, and the user can select an event as a start event from among the samples.

Here, among the start events, a start event other than a change of the frame rate of the second image, that is, for example, a predetermined situation change detected from the second image or sensor information, is also referred to as a specific start event.

In the event mode, the special reproduction of the second image is performed only for the special reproduction period TS in a case where a specific start event occurs, and the special reproduction of the second image is not performed when a start event other than a specific start event, that is, a change of the frame rate of the second image, is performed.

On the other hand, in the equal interval mode, both in a case where a specific start event occurs and in a case where a change of the frame rate of the second image is performed as a start event other than a specific start event, the special reproduction of the second image is performed.

Hereinafter, another exemplary process by the digital camera of FIG. 1 will be described with reference to FIG. 9.

In steps S31 and S32, processes similar to those of steps S11 and S12 in FIG. 5 are performed, respectively.

That is, in step S31, after the user operates the input device 17 to turn on the power, the control unit 18 turns on the power of the digital camera, and the process proceeds to step S32.

In step S32, the control unit 18 sets the frame rate of the first image to the default frame rate, and controls the imaging device 12 such that the imaging device 12 outputs the first image with the default frame rate.

Further, the control unit 18 sets the frame rate of the second image, and controls the imaging device 12 such that the imaging device 12 outputs the second image with that frame rate.

The imaging device 12 starts outputting the first and second images with the frame rates designated under the control of the control unit 18, and the digital signal processing unit 13 starts processing the first and second images.

Once the processing of the first and second images is started, the process proceeds from step S32 to step S33.

In step S33, the display control unit 35 determines which of the event mode and the equal interval mode the operation mode is set to.

In a case where it is determined in step S33 that the operation mode is set to the event mode, the process proceeds to step S34, where the digital camera in FIG. 1 performs an event mode process to be described later, and the process proceeds to step S36.

In contrast, in a case where it is determined in step S33 that the operation mode is set to the equal interval mode, the process proceeds to step S35, where the digital camera in FIG. 1 performs an equal interval mode process to be described later, and the process proceeds to step S36.

In step S36, the control unit 18 turns off the power of the digital camera, and finishes the process.

Figure 10:
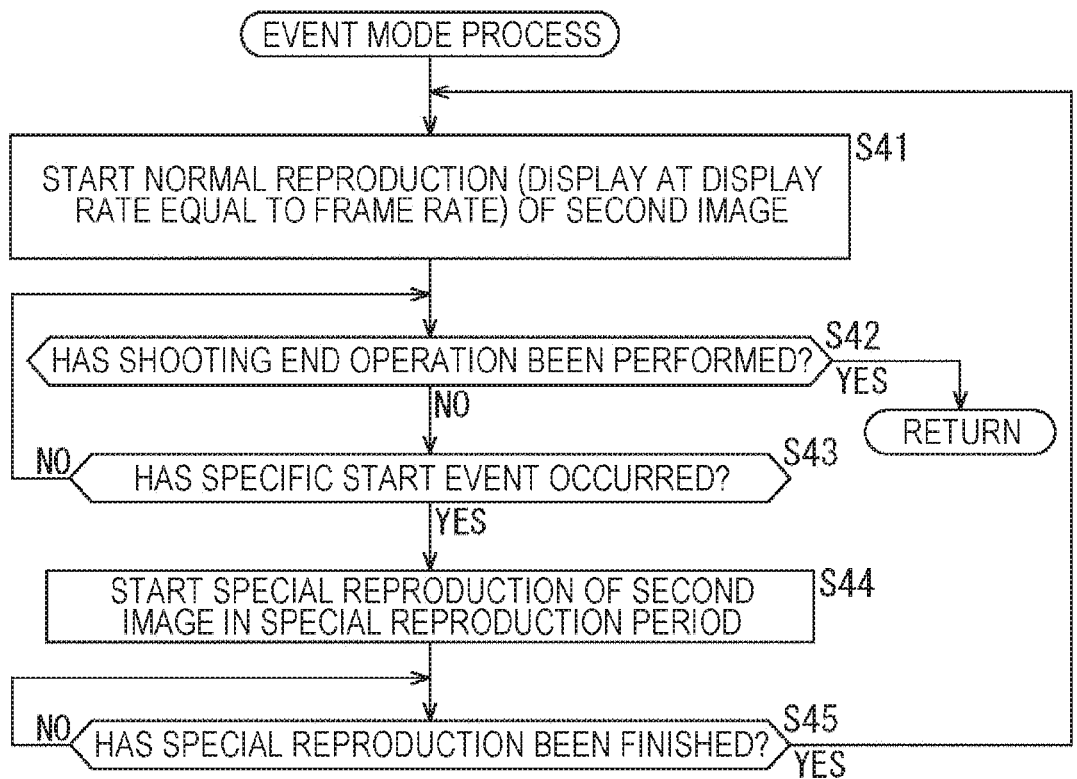
FIG. 10 is a flowchart for explaining an example of an event mode process performed in step S34.

FIG. 10 is a flowchart for explaining an example of the event mode process performed in step S34 of FIG. 9.

Here, the frame rate of the second image can be changed by a change operation in either the event mode or the equal interval mode. However, as described with reference to FIG. 9, in the event mode, the special reproduction of the second image is not performed in response to a change of the frame rate of the second image.

In the event mode process, in step S41, the display control unit 35 starts the normal reproduction of the second image, that is, starts the display process for displaying the second image on the display device 14 at the display rate of the display device 14 equal to the frame rate of the second image.

Thereafter, the process proceeds from step S41 to step S42, where the control unit 18 determines whether the user has performed a shooting end operation for finishing shooting with the digital camera as an operation for the input device 17.

In a case where it is determined in step S42 that a shooting end operation has been performed, the event mode process is finished, and the process returns.

In contrast, in a case where it is determined in step S42 that a shooting end operation has not been performed, the process proceeds to step S43, where the display control unit 35 determines whether a specific start event has occurred.

In a case where it is determined in step S43 that a specific start event has not occurred, the process returns to step S42, and a similar process is repeated thereafter.

In contrast, in a case where it is determined in step S43 that a specific start event has occurred, the process proceeds to step S44, where the display control unit 35 performs slow reproduction as the special reproduction of the second image in the special reproduction period TS, and the process proceeds to step S45.

In step S45, the display control unit 35 determines whether the special reproduction of the second image in the special reproduction period TS started in step S44 has been finished.

In a case where it is determined in step S45 that the special reproduction of the second image in the special reproduction period TS has not been finished, the process returns to step S45.

In contrast, in a case where it is determined in step S45 that the special reproduction of the second image in the special reproduction period TS has been finished, the process returns to step S41, where the display control unit 35 starts the normal reproduction of the second image as described above, and a similar process is repeated thereafter.

As described above, in the event mode (process), the special reproduction of the second image is performed only for the special reproduction period TS only in a case where a specific start event occurs, and thereafter normal reproduction is performed again.

Figure 11:
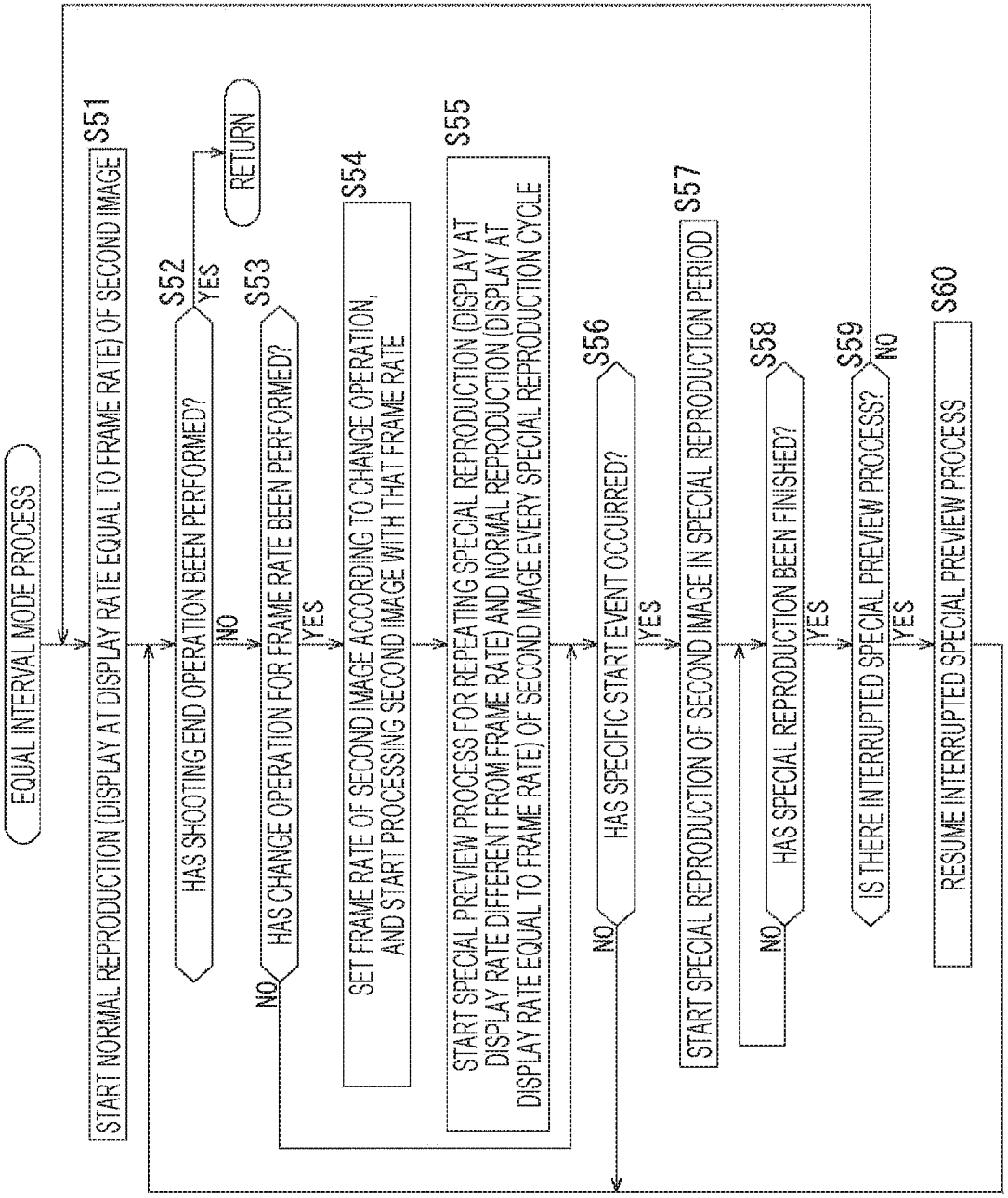
FIG. 11 is a flowchart for explaining an example of an equal interval mode process performed in step S35.

FIG. 11 is a flowchart for explaining an example of the equal interval mode process performed in step S35 of FIG. 9.

In steps S51 and S52 of the equal interval mode process, processes similar to those of steps S41 and S42 in FIG. 10 are performed, respectively.

That is, in step S51, the display control unit 35 starts the normal reproduction of the second image, and the process proceeds to step S52.

In step S52, the control unit 18 determines whether the user has performed a shooting end operation for finishing shooting with the digital camera as an operation for the input device 17.

In a case where it is determined in step S52 that a shooting end operation has been performed, the equal interval mode process is finished, and the process returns.

In contrast, in a case where it is determined in step S52 that a shooting end operation has not been performed, the process proceeds to step S53, where the control unit 18 determines whether the user has performed a change operation for changing the frame rate (imaging rate) of the image as an operation for the input device 17.

In a case where it is determined in step S53 that no change operation has been performed, the process skips steps S54 and S55 and proceeds to step S56.

In contrast, in a case where it is determined in step S53 that a change operation has been performed, the process proceeds to step S54.

In step S54, the control unit 18 sets (changes) the frame rate of the second image according to the change operation, and controls the imaging device 12 such that the imaging device 12 outputs the second image with the frame rate designated by the change operation.

Under the control of the control unit 18, the imaging device 12 starts outputting the second image with the frame rate designated by the change operation, and the digital signal processing unit 13 starts processing the second image.

As described above, once the processing of the second image is started, the process proceeds from step S54 to step S55.

In step S55, the display control unit 35 of the digital signal processing unit 13 starts a special preview process for repeating the special reproduction and the normal reproduction of the second image with the frame rate designated by the change operation every predetermined special reproduction cycle, and the process proceeds to step S56.

In step S56, the display control unit 35 determines whether a specific start event has occurred.

In a case where it is determined in step S56 that a specific start event has not occurred, the process returns to step S52, and a similar process is repeated thereafter.

In contrast, in a case where it is determined in step S56 that a specific start event has occurred, the process proceeds to step S57.

In step S57, in a case where the special preview process of the second image is being performed, the display control unit 35 interrupts the special preview process and starts slow reproduction as the special preview process of the second image in the special reproduction period TS, and the process proceeds to step S58.

In step S58, the display control unit 35 determines whether the special reproduction of the second image in the special reproduction period TS started in step S57 has been finished.

In a case where it is determined in step S58 that the special reproduction of the second image in the special reproduction period TS has not been finished, the process returns to step S58.

In contrast, in a case where it is determined in step S58 that the special reproduction of the second image in the special reproduction period TS has been finished, the process proceeds to step S59, where the display control unit 35 determines whether there is an interrupted special preview process.

In a case where it is determined in step S59 that there is no interrupted special preview process, the process returns to step S51, where the display control unit 35 starts the normal reproduction of the second image as described above, and a similar process is repeated thereafter.

In contrast, in a case where it is determined in step S60 that there is an interrupted special preview process, that is, in a case where the special preview process is interrupted at the time of starting the special reproduction of the second image in step S57, the process proceeds to step S60.

In step S60, the display control unit 35 resumes the interrupted special preview process, the process returns to step S52, and a similar process is repeated thereafter.

As described above, in the equal interval mode (process), in a case where the second frame rate is changed, the special preview process for repeating the special reproduction and the normal reproduction of the second image is performed. Furthermore, in the equal interval mode, in a case where a specific start event occurs, the special reproduction of the second image is performed only for the special reproduction period TS, and thereafter the normal reproduction or special preview process is performed again.

Note that in a case where an event (predetermined situation change) detected from the second image or sensor information is adopted as a specific start event, in the digital camera, the special reproduction period TS can be set according to the user's operation or the like, or can be set, for example, to a period that the user may want to set according to an event detected from the second image or sensor information.

For example, in a case where a scene in which a person is moving is set as a start event, the period from the first frame to the last frame of the scene in which the person is moving can be set as the special reproduction period TS.

In addition, in a case where an event detected from the second image or sensor information is adopted as a specific start event, in the digital camera, the start timing of special reproduction can be set to the timing at which a specific start event occurs, or can be set, for example, to a timing that the user may want to set according to an event detected from the second image or sensor information.

For example, in a case where a scene in which a person is moving is set as a start event, the timing of the beginning of a part in which the person is moving at a speed equal to or larger than a predetermined speed can be set as the start timing of special reproduction from the scene in which the person is moving.

Moreover, in addition to an event detected from the second image or sensor information, for example, a predetermined operation for the input device 17 or the like can be adopted as a specific start event.

Capturing and Displaying Second Image in Event Mode Process

Figure 12:
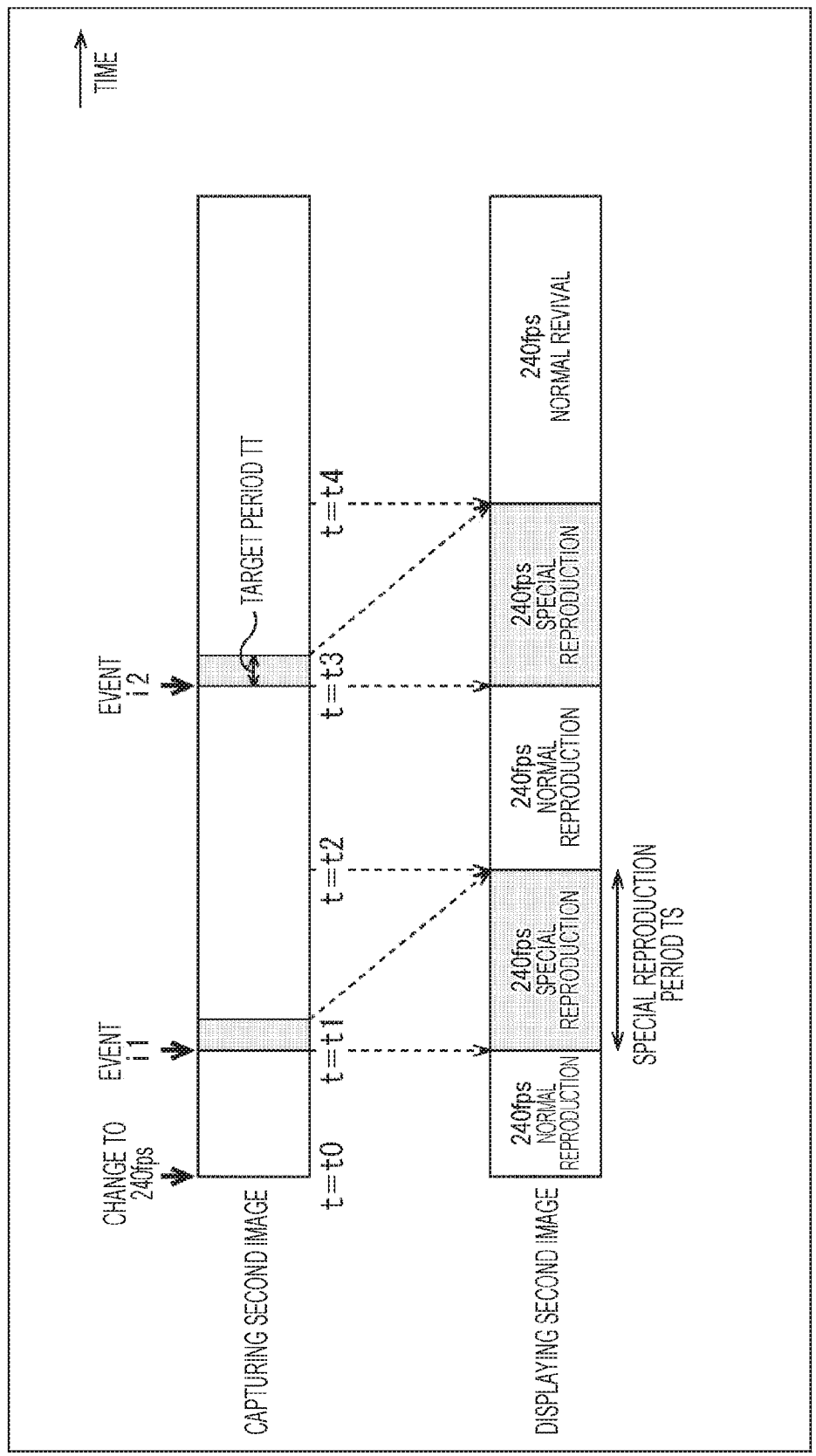
FIG. 12 is a timing chart for explaining a first example of the timing of capturing and displaying the second image in the event mode process.

FIG. 12 is a timing chart for explaining a first example of the timing of capturing and displaying the second image in the event mode process.

In FIG. 12, at time t=t0, the user performs a change operation, and the frame rate of the second image is changed to 240 fps.

In the event mode process, the special reproduction of the second image is not started in response to the change of the frame rate of the second image, and normal reproduction is performed.

In FIG. 12, at time t=t1 after the change of the frame rate of the second image to 240 fps, event i1 occurs as a specific start event.

At time t=t1, in response to the occurrence of event i1 as a specific start event, slow reproduction is started as the 240-fps special reproduction of the second image with a frame rate of 240 fps.

The 240-fps special reproduction of the second image started at time t=t1 is performed only for the special reproduction period TS, and finished at time t=t2 after the lapse of the special reproduction period TS.

From time t=t2, the 240-fps normal reproduction of the second image with a frame rate of 240 fps is performed.

In FIG. 12, at subsequent time t=t3, event i2 occurs as a specific start event.

At time t=t3, in response to the occurrence of event i2 as a specific start event, slow reproduction is started as the 240-fps special reproduction of the second image with a frame rate of 240 fps.

The 240-fps special reproduction of the second image started at time t=t3 is performed only for the special reproduction period TS, and finished at time t=t4 after the lapse of the special reproduction period TS.

From time t=t4, the 240-fps normal reproduction of the second image with a frame rate of 240 fps is performed.

As described above, in a case where slow reproduction as the special reproduction of the second image is performed only for the special reproduction period TS in response to the occurrence of a specific start event, the user can check whether the scene of the occurrence of the specific start event is the user's desired slow motion image, and can decide the frame rate of the second image quickly.

Note that in the event mode, after the special reproduction of the second image in the special reproduction period is performed in response to the occurrence of a specific start event, the normal reproduction of the second image is performed unless the power of the digital camera is turned off or another specific start event occurs, for example. Further, in the event mode, special reproduction and normal reproduction are not periodically performed unlike in the special preview process. Therefore, it is unnecessary to set the normal bond period TN and the special reproduction cycle TC.

Figure 13:
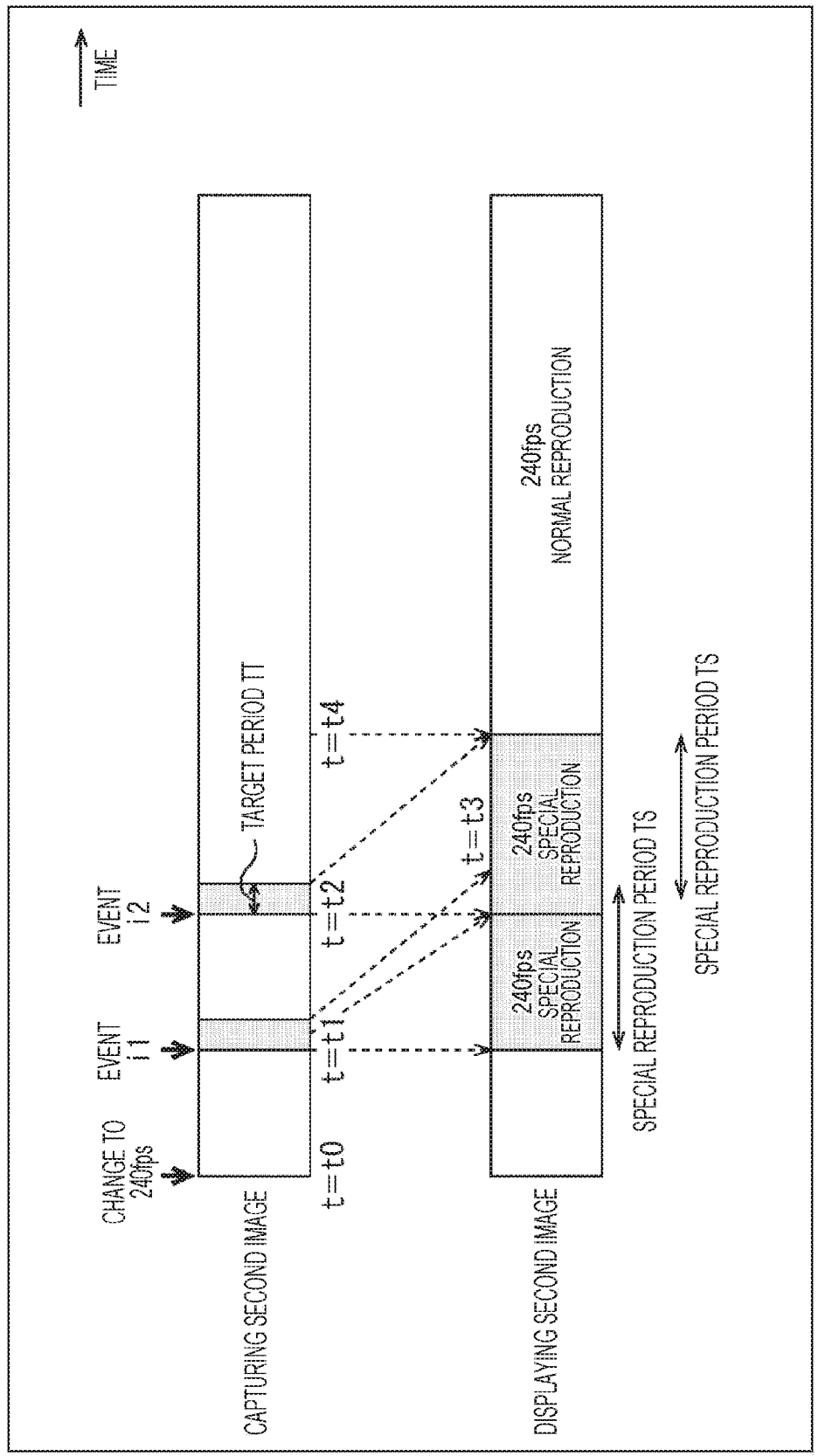
FIG. 13 is a timing chart for explaining a second example of the timing of capturing and displaying the second image in the event mode process.

FIG. 13 is a timing chart for explaining a second example of the timing of capturing and displaying the second image in the event mode process.

In FIG. 13, at time t=t0, the user performs a change operation, and the frame rate of the second image is changed to 240 fps.

In the event mode process, the special reproduction of the second image is not started in response to the change of the frame rate of the second image, and normal reproduction is performed.

In FIG. 13, at time t=t1 after the change of the frame rate of the second image to 240 fps, event i1 occurs as a specific start event.

At time t=t1, in response to the occurrence of event i1 as a specific start event, slow reproduction is started as the 240-fps special reproduction of the second image with a frame rate of 240 fps.

The 240-fps special reproduction of the second image started at time t=t1 is performed until the special reproduction period TS ends at time t=t3 in a normal situation. In FIG. 13, however, after time t=t1, event i2 occurs as a specific start event at time t=t2 prior to time t=t3.

In FIG. 13, in response to the occurrence of event i2 as a specific start event at time t=t2, the 240-fps special reproduction of the second image started at time t=t1 is finished immediately, and the 240-fps special reproduction of the second image is started at time t=t2.

The 240-fps special reproduction of the second image started at time t=t2 is performed until the special reproduction period TS ends at time t=t4, and finished at time t=t4.

From time t=t4, the 240-fps normal reproduction of the second image with a frame rate of 240 fps is performed.

Note that, in FIG. 13, in response to the occurrence of event i2 as a specific start event at time t=t2, the 240-fps special reproduction of the second image started at time t=t1 is finished immediately, and the 240-fps special reproduction of the second image is started at time t=t2.

However, instead of immediately finishing the 240-fps special reproduction of the second image started at time t=t1 in response to the occurrence of event i2 as a specific start event at time t=t2, it is possible to perform the 240-fps special reproduction of the second image started at time t=t1 until the special reproduction period TS ends at time t=t3, and thereafter start the 240-fps special reproduction of the second image in response to the occurrence of event i2 as a specific start event.

Capturing and Displaying Second Image in Equal Interval Mode Process

Figure 14:
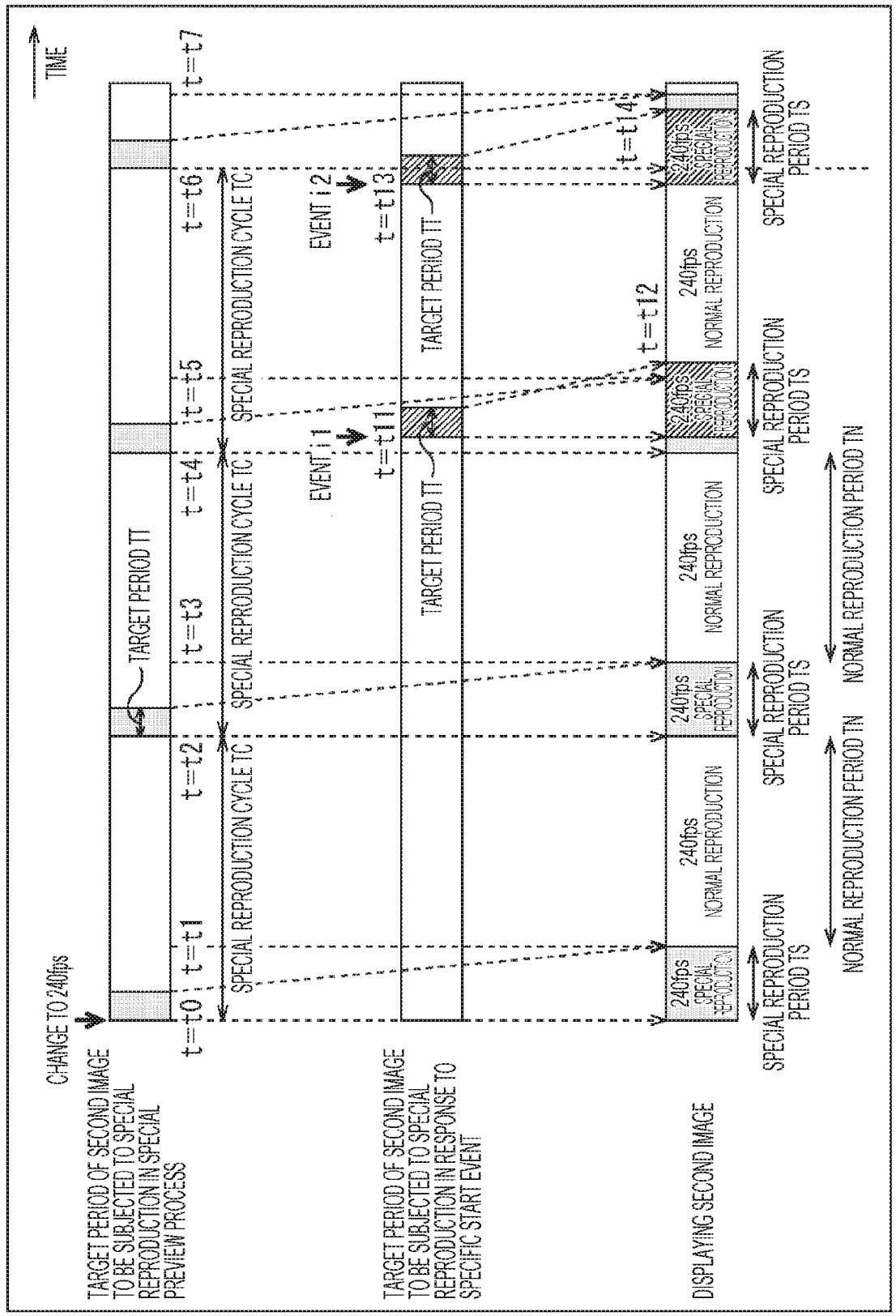
FIG. 14 is a timing chart for explaining a first example of the timing of capturing and displaying the second image in the equal interval mode process.

FIG. 14 is a timing chart for explaining a first example of the timing of capturing and displaying the second image in the equal interval mode process.

Note that, in FIG. 14 (and FIG. 15 to be described later), in order to avoid making the figure complicated with regard to the timing of capturing the second image, the target period TT of the second image to be subjected to special reproduction in the special preview process started in response to a change of the frame rate of the second image and the target period TT of the second image to be subjected to special reproduction started in response to the occurrence of a specific start event are separately illustrated.

In addition, in FIG. 14, the special reproduction of the special preview process started in response to a change of the frame rate of the second image and the special reproduction started in response to the occurrence of a specific start event are separately described first, and then the special reproduction (and the normal reproduction) of the second image finally performed is described.

In FIG. 14, at time t=0, the user performs a change operation, the frame rate of the second image is changed to 240 fps, and in response to the change of the frame rate, the special preview process of the second image with a frame rate of 240 fps is started.

That is, at time t=0, slow reproduction is started as the 240-fps special reproduction of the second image, and the 240-fps special reproduction started at time t=0 is performed until the special reproduction period TS from time t=0 ends at time t=t1.

At time t1, the normal reproduction period TN is started. In the normal reproduction period TN from time t=t1, the 240-fps normal reproduction of the second image with a frame rate of 240 fps captured in the normal reproduction period TN is performed.

At time t=t2 after the lapse of the special reproduction cycle TC from time t=0 at which the last 240-fps special reproduction was started, the 240-fps normal reproduction of the second image started at time t=t1 is finished.

Time t=t2 is the start time of a new special reproduction cycle TC, and slow reproduction is started at time t=t2 as the 240-fps special reproduction of the second image captured in the target period TT.

Thereafter, the 240-fps special reproduction of the second image with a frame rate of 240 fps is performed until the special reproduction period TS ends at time t=t3, and from time t=t3, the 240-fps normal reproduction of the second image with a frame rate of 240 fps is performed until the normal reproduction period TN ends at time t=t4.

At time t=t4, the 240-fps normal reproduction of the second image started at time t=t3 is finished.

Further, time t=t4 is the start time of a new special reproduction cycle TC, and slow reproduction is started at time t=t4 as the 240-fps special reproduction of the second image captured in the target period TT.

Thereafter, the 240-fps special reproduction of the second image with a frame rate of 240 fps is performed until the special reproduction period TS ends at time t=t5, and from time t=t5, the 240-fps normal reproduction of the second image with a frame rate of 240 fps is performed until the normal reproduction period TN ends at time t=t6.

Time t=t6 is the start time of a new special reproduction cycle TC, and slow reproduction is started at time t=t6 as the 240-fps special reproduction of the second image captured in the target period TT.

Thereafter, the 240-fps special reproduction of the second image with a frame rate of 240 fps is performed until the special reproduction period TS ends at time t=t7. Thereafter, similarly, in the special preview process started in response to the change of the frame rate of the second image, special reproduction and normal reproduction are periodically repeated.

On the other hand, in FIG. 14, event i1 occurs at time t=t11 as a specific start event.

At time t=t11, in response to the occurrence of event i1 as a specific start event, slow reproduction is started as the 240-fps special reproduction of the second image with a frame rate of 240 fps.

The 240-fps special reproduction of the second image started at time t=t11 is performed only for the special reproduction period TS, and finished at time t=t12 after the lapse of the special reproduction period TS.

From time t=t12, the 240-fps normal reproduction of the second image with a frame rate of 240 fps is performed.

In FIG. 14, at subsequent time t=t13, event i2 occurs as a specific start event.

At time t=t13, in response to the occurrence of event i2 as a specific start event, slow reproduction is started as the 240-fps special reproduction of the second image with a frame rate of 240 fps.

The 240-fps special reproduction of the second image started at time t=t13 is performed only for the special reproduction period TS, and finished at time t=t14 after the lapse of the special reproduction period TS.

From time t=t14, the 240-fps normal reproduction of the second image with a frame rate of 240 fps is performed.

Hereinafter, the special reproduction of the special preview process started in response to a change of the frame rate of the second image is also referred to as the special reproduction associated with a change of the frame rate.

In addition, the special reproduction started in response to the occurrence of a specific start event is also referred to as the special reproduction associated with a specific start event.

In a case where the special reproduction period TS in which the special reproduction associated with a change of the frame rate is performed does not overlap with the special reproduction period TS in which the special reproduction associated with a specific start event is performed, each of the special reproduction associated with a change of the frame rate and the special reproduction associated with a specific start event can be performed only for the special reproduction period TS.

However, in a case where the special reproduction period TS in which the special reproduction associated with a change of the frame rate is performed overlaps with the special reproduction period TS in which the special reproduction associated with a specific start event is performed, one of the special reproduction associated with a change of the frame rate and the special reproduction associated with a specific start event is hindered by the other special reproduction.

In FIG. 14, at time t=t11 in the special reproduction period TS in which the special reproduction associated with the change of the frame rate has been performed since time t=t4, event i1 occurs as a specific start event. The special reproduction associated with this event i1 is hindered by the special reproduction associated with the change of the frame rate that has already been started since time t=t4.

Further, in FIG. 14, time t=t6 in the special reproduction period TS in which the special reproduction associated with event i2 has been performed in response to the occurrence of event i2 as a specific start event at time t=t13 is the start time of the special reproduction associated with the change of the frame rate. The special reproduction associated with the change of the frame rate started at time t=t6 is hindered by the special reproduction associated with event i2 that has already been started.

As described above, in a case where one of the special reproduction associated with a change of the frame rate and the special reproduction associated with a specific start event is hindered by the other special reproduction, for example, either the special reproduction associated with a change of the frame rate or the special reproduction associated with a specific start event can be prioritized.

Either the special reproduction associated with a change of the frame rate or the special reproduction associated with a specific start event prioritized over the other is hereinafter also referred to as a priority special reproduction.

The priority special reproduction can be fixed to either the special reproduction associated with a change of the frame rate or the special reproduction associated with a specific start event, or can be changed as appropriate.

That is, in a case where the special reproduction period TS in which the special reproduction associated with a change of the frame rate is performed overlaps with the special reproduction period TS in which the special reproduction associated with a specific start event is performed, for example, the special reproduction started earlier than the other special reproduction in the overlapping section can be prioritized as the priority special reproduction.

In FIG. 14, among the special reproduction associated with a change of the frame rate and the special reproduction associated with a specific start event, for example, the special reproduction associated with a specific start event is prioritized as the priority special reproduction.

That is, in FIG. 14, the special reproduction period TS from time t=t4 in which the special reproduction associated with the change of the frame rate is performed overlaps with the special reproduction period TS in which the special reproduction associated with event i1 that occurred at time t=t11 is performed.

The special reproduction associated with the change of the frame rate from time t=t4 is started before the special reproduction associated with event i1 that occurred at time t=t11. However, in a case where the special reproduction associated with a specific start event is prioritized as the priority special reproduction, the special reproduction associated with the change of the frame rate started earlier at time t=t4 is finished at time t=t11.

Then, from time t=t11, the special reproduction associated with event i1 that occurred at time t=t11 is performed only for the special reproduction period TS.

In addition, for example, in FIG. 14, the special reproduction period TS in which the special reproduction associated with event i2 that occurred at time t=t13 is performed overlaps with the special reproduction period TS from time t=t6 in which the special reproduction associated with the change of the frame rate is performed.

The special reproduction associated with event i2 that occurred at time t=t13 is started before the special reproduction associated with the change of the frame rate from time t=t6. However, in a case where the special reproduction associated with a specific start event is prioritized as the priority special reproduction, the special reproduction associated with the change of the frame rate from time t=t6 is not started even at time t=t6 when the special reproduction associated with the change of the frame rate is scheduled to be started. Then, the special reproduction associated with event i2 that occurred at time t=t13, which was started earlier, is continued as it is.

Thereafter, at time t=t14 after the lapse of the special reproduction period TS from time t=t13, the special reproduction associated with event i2 is finished.

Here, if the special reproduction associated with the change of the frame rate from time t=t6 is started at time t=t6, time t=t7 when the special reproduction is finished, that is, time t=t7 after the lapse of the special reproduction period TS from time t=t6, is later than time t=t14 at which the special reproduction associated with event i2 is finished.

Therefore, after the special reproduction associated with event i2 as the priority special reproduction is finished at time t=t14, the special reproduction associated with the change of the frame rate can be performed until time t=t7, i.e., the end of the special reproduction associated with the change of the frame rate started from time t=t6.

Note that, in the above case, in a case where the special reproduction period TS in which the special reproduction associated with a change of the frame rate is performed overlaps with the special reproduction period TS in which the special reproduction associated with a specific start event is performed, either the special reproduction associated with a change of the frame rate or the special reproduction associated with a specific start event is prioritized.

However, in a case where the special reproduction period TS in which the special reproduction associated with a change of the frame rate is performed overlaps with the special reproduction period TS in which the special reproduction associated with a specific start event is performed, instead of prioritizing either the special reproduction associated with a change of the frame rate or the special reproduction associated with a specific start event, it is possible to perform special reproduction from the second image at the timing of the beginning of the total period of the overlapping special reproduction periods TS.

In addition, in FIG. 14, regarding the special reproduction with respect to a change of the frame rate, that is, the special reproduction of the special preview process, the time (for example, time t=t2 or the like) after the lapse of the special reproduction cycle TC from the time at which the last special reproduction associated with the change of the frame rate was started (for example, time t=t0 or the like) is set as the start time of a new special reproduction cycle TC, and the special reproduction associated with the change of the frame rate is performed.

However, for example, the time at which the last special reproduction was started can be adopted as the start time of a new special reproduction cycle TC, regardless of the special reproduction associated with a change of the frame rate or the special reproduction associated with a specific start event.

Figure 15:
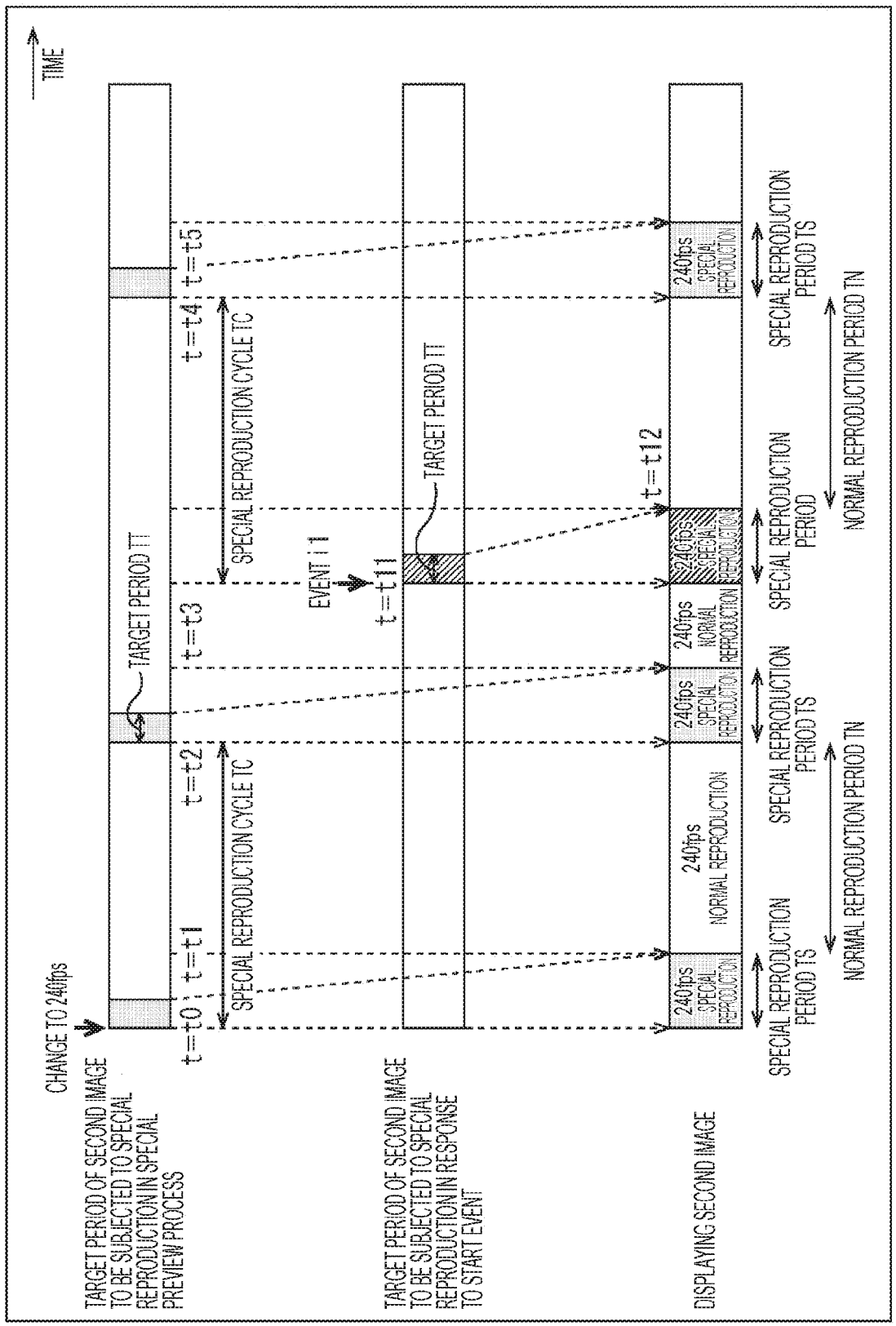
FIG. 15 is a timing chart for explaining a second example of the timing of capturing and displaying the second image in the equal interval mode process.

FIG. 15 is a timing chart for explaining a second example of the timing of capturing and displaying the second image in the equal interval mode process.

In FIG. 15, at time t=t0, the user performs a change operation, the frame rate of the second image is changed to 240 fps, and in response to the change of the frame rate, the special preview process of the second image with a frame rate of 240 fps is started.

That is, at time t=t0, slow reproduction is started as the special reproduction of the second image, and the special reproduction started at time t=t0 is performed until the special reproduction period TS from time t=t0 ends at time t=t1.

At time t1, the normal reproduction period TN is started. In the normal reproduction period TN from time t=t1, the normal reproduction of the second image with a frame rate of 240 fps captured in the normal reproduction period TN is performed.

At time t=t2 after the lapse of the special reproduction cycle TC from time t=t0 at which the last special reproduction was started, the normal reproduction of the second image started at time t=t1 is finished.

Then, time t=t2 after the lapse of the special reproduction cycle TC from time t=t0 at which the last special reproduction was started is set as the start time of a new special reproduction cycle TC, and slow reproduction is started at time t=t2 as the special reproduction of the second image captured in the target period TT.

The special reproduction of the second image from time t=t2 is performed until the special reproduction period TS ends at time t=t3, and the normal reproduction of the second image with a frame rate of 240 fps is started at time t=t3.

The normal reproduction of the second image from time t=t3 is performed until the normal reproduction period TN ends in a normal situation. In FIG. 15, however, event i1 occurs as a specific start event at time t=t11 before the lapse of the normal reproduction period TN from time t=t3.

Therefore, at time t=t11, the normal reproduction of the second image from time t=t3 is finished, and slow reproduction is started as the special reproduction of the second image in response to the occurrence of event i1 as a specific start event.

The special reproduction of the second image started at time t=t11 is performed only for the special reproduction period TS, and finished at time t=t12 after the lapse of the special reproduction period TS.

From time t=t12, the normal reproduction of the second image with a frame rate of 240 fps is performed.

At time t=t4 after the lapse of the special reproduction cycle TC from time t=t11 at which the last special reproduction was started, the normal reproduction of the second image started at time t=t12 is finished.

Then, time t=t4 after the lapse of the special reproduction cycle TC from time t=t11 at which the last special reproduction was started is set as the start time of a new special reproduction cycle TC, and slow reproduction is started at time t=t4 as the special reproduction of the second image captured in the target period TT.

The special reproduction of the second image from time t=t4 is performed until the special reproduction period TS ends at time t=t5, and the normal reproduction of the second image with a frame rate of 240 fps is started at time t=t5.

Thereafter, similarly, in FIG. 15, the time at which the last special reproduction was started is set as the start time of a new special reproduction cycle TC, and the special reproduction of the special preview process is performed, regardless of the special reproduction associated with a change of the frame rate or the special reproduction associated with a specific start event.

As described above, by setting, to an appropriate timing, the start timing of the special reproduction of the second image, that is, the start timing of starting the display of a preview for checking the slow motion image of the second image, for example, the frame rate of the second image for obtaining the user's desired slow motion image can be decided more quickly.

Therefore, the frame rate of the second image can be decided in a short time. Thus, it is possible to suppress the missing of the photographing opportunity, and to take (record) the user's desired image (second image) in a short time.

Note that special reproduction in the above description is slow reproduction for displaying the second image at a display rate smaller than the frame rate of the second image. However, the present technology can also be applied to the case of performing fast-forward reproduction as special reproduction in which the second image is displayed at a display rate larger than the frame rate of the second image.

However, in a case where the fast-forward reproduction of the second image is performed, it is necessary to start the fast-forward reproduction of the second image after buffering the frames of the second image required in the period of the fast-forward reproduction. Therefore, in a case where fast-forward reproduction is performed, there is a risk that at least a delay corresponding to buffering will occur.

Description of Computer to which Present Technology is Applied

Next, the above-mentioned sequence of processes can be executed by hardware, and can also be executed by software. In a case where the sequence of processes is executed by software, a program constituting the software is installed on a general-purpose computer or the like.

Figure 16:
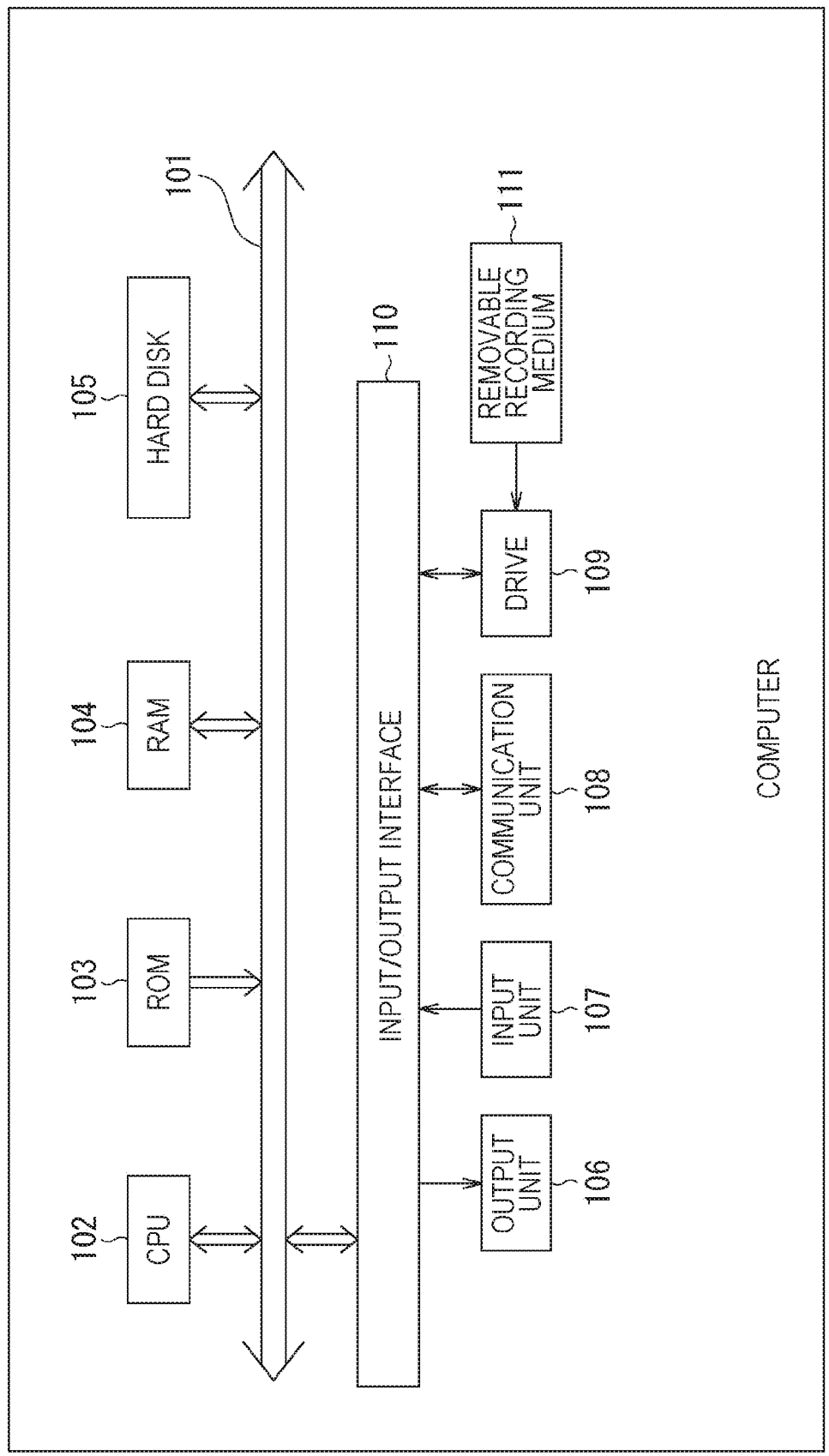
FIG. 16 is a block diagram illustrating an exemplary configuration of one embodiment of a computer to which the present technology is applied.

FIG. 16 is a block diagram illustrating an exemplary configuration of one embodiment of a computer on which a program for executing the above-mentioned sequence of processes is installed.

The program can be recorded in advance in a hard disk 105 or a ROM 103 as a recording medium built in the computer.

Alternatively, the program can be stored (recorded) in a removable recording medium 111. Such a removable recording medium 111 can be provided as what is called package software. Here, examples of the removable recording medium 111 include a flexible disk, a compact disc read only memory (CD-ROM), a magneto optical (MO) disk, a digital versatile disc (DVD), a magnetic disk, a semiconductor memory, and the like.

Note that the program can be downloaded to the computer via a communication network or a broadcast network and installed in the built-in hard disk 105, instead of being installed on the computer from the removable recording medium 111 as described above. In other words, for example, the program can be wirelessly transferred from a download site to the computer via an artificial satellite for digital satellite broadcasting, or can be transferred by wire to the computer via a network such as a local area network (LAN) or the Internet.

The computer incorporates a central processing unit (CPU) 102, and an input/output interface 110 is coupled to the CPU 102 via a bus 101.

In response to a command being input through the input/output interface 110 by the user's operation for an input unit 107, for example, the CPU 102 executes the program stored in the read only memory (ROM) 103 according to the command. Alternatively, the CPU 102 loads the program stored in the hard disk 105 into a random access memory (RAM) 104, and executes the program.

As a result, the CPU 102 performs the processes according to the above-described flowcharts or the processes performed with the configuration of the above-described block diagram. Then, the CPU 102 outputs the processing result as necessary, for example, via the input/output interface 110 from an output unit 106, sends the processing result from a communication unit 108, or records the processing result on the hard disk 105, for example.

Note that the input unit 107 includes a keyboard, a mouse, a microphone, and the like. In addition, the output unit 106 includes a liquid crystal display (LCD), a speaker, and the like.

Here, in this description, the processes performed by the computer in accordance with the program do not necessarily have to be performed in chronological order in accordance with the order described in the flowcharts. That is, the processes performed by the computer in accordance with the program also include processes that are executed in parallel or individually (for example, parallel processes or processes by an object).

In addition, the program may be processed by one computer (processor), or may be distributed to a plurality of computers and processed. Further, the program may be transferred to a remote computer and executed.

Furthermore, in the present description, the system means a collection of a plurality of components (devices, modules (parts), or the like), whether all the components exist in the same housing or not. Therefore, both a plurality of devices housed in separate housings and coupled via a network and a single device including a single housing in which a plurality of modules is housed are the systems.

Note that the embodiment of the present technology is not limited to the above-mentioned embodiment, and can be variously changed in a range not departing from the gist of the present technology.

For example, the present technology can take a configuration of cloud computing in which a single function is shared and processed by a plurality of devices in cooperation with each other via a network.

In addition, the respective steps described in the above-mentioned flowcharts can be executed by a single device, or can be shared and executed by a plurality of devices.

Furthermore, in a case where a plurality of processes is included in a single step, the plurality of processes included in the single step can be executed by a single device, or can be shared and executed by a plurality of devices.

In addition, the effects described in the present description are only examples, and the effects of the present technology are not limited to these effects. Additional effects may also be obtained.

Note that the present technology can adopt the following configuration.

<1>
A display control device including
a display control unit that starts, in response to a predetermined situation change, special reproduction for displaying an image having a variable frame rate on a display device at a display rate different from the frame rate.
<2>
The display control device according to <1>, in which
the display control unit performs the special reproduction only for a predetermined special reproduction period in response to the predetermined situation change.
<3>
The display control device according to <2>, in which
the display control unit performs a special preview process for repeating, every predetermined special reproduction cycle, the special reproduction performed only for the predetermined special reproduction period in response to a change of the frame rate.
<4>
The display control device according to <1>, in which
the predetermined situation change is a change of the frame rate.
<5>
The display control device according to <3>, in which
a target period of the image to be subjected to the special reproduction is set in accordance with an operation by a user.
<6>
The display control device according to <3> or <5>, in which
the special reproduction period and the special reproduction cycle are set in accordance with an operation by a user.
<7>
The display control device according to any one of <3> to <6>, in which
the display control unit performs normal reproduction for displaying the image on the display device at the display rate equal to the frame rate in a normal reproduction period, the normal reproduction period being a period other than the special reproduction period within the special reproduction cycle.
<8>
The display control device according to any one of <3> to <7>, in which
in a case where the frame rate is changed, the display control unit starts the special preview process for the image with the changed frame rate.
<9>
The display control device according to any one of <3> to <7>, in which
in a case where the frame rate is changed, the display control unit starts the special preview process for the image with the changed frame rate after an end of the special reproduction cycle of the special preview process for the image with the previous frame rate performed at the time of the change.
21 10>
The display control device according to <4>, in which
in a case where the frame rate is changed to a rate larger than the display rate, the image is subjected to slow reproduction, and
in a case where the frame rate is changed to a rate smaller than the display rate, the image is subjected to fast-forward reproduction.
<11>
The display control device according to <1>, in which
the predetermined situation change is a situation change detected from the image.

<12>

The display control device according to <1> or <11>, in which the predetermined situation change is a situation change detected from sensor information obtained by sensing performed at the time of capturing the image.

<13>

The display control device according to any one of <2>, <11>, and <12>, in which the display control unit performs a special preview process for repeating, every predetermined special reproduction cycle, the special reproduction performed only for the predetermined special reproduction period, and performs the special reproduction only for the predetermined special reproduction period in response to the predetermined situation change.

<14>

The display control device according to <13>, in which the display control unit performs the special preview process in response to a change of the frame rate, and performs the special reproduction for the predetermined special reproduction period in response to the predetermined situation change other than a change of the frame rate.

<15>

The display control device according to <14>, in which in a case where the predetermined situation change other than a change of the frame rate occurs, the display control unit immediately performs the special reproduction only for the predetermined special reproduction period.

<16>

The display control device according to <14> or <15>, in which the predetermined situation change other than a change of the frame rate is set in accordance with an operation by a user.

<17>

The display control device according to any one of <14> to <16>, in which which of:

the special reproduction in response to the predetermined situation change other than a change of the frame rate; and both the special reproduction in response to the predetermined situation change other than a change of the frame rate and the special preview process in response to a change of the frame rate is to be performed is set in accordance with an operation by a user.

<18>

A display control method including a step of starting, in response to a predetermined situation change, special reproduction for displaying an image having a variable frame rate on a display device at a display rate different from the frame rate.

<19>

A program for causing a computer to function as a display control unit that starts, in response to a predetermined situation change, special reproduction for displaying an image having a variable frame rate on a display device at a display rate different from the frame rate.

REFERENCE SIGNS LIST

11 Optical system
12 Imaging device
13 Digital signal processing unit
14, 15 Display device
16 Memory
17 Input device
18 Control unit
19 Sensor unit
20 Driver IC
31, 32 Development processing unit
33 Image analysis unit
34 Recording/reproducing processing unit
35 Display control unit
41 Dial
42 Shutter button
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. A display control device, comprising:
a display control unit configured to:
start, based on a first frame rate of an image, a special preview process of special reproduction of the image,
wherein, in the special preview process, the special reproduction of the image repeats after a special reproduction cycle;
control a display device to display the image at a display rate different from the first frame rate of the image, based on the special reproduction, wherein
the image is displayed at the display rate different from the first frame rate for a specific special reproduction period, and
the first frame rate of the image is variable; and
control, in normal reproduction, the display device to display the image at the display rate, wherein
the image is displayed, in the normal reproduction for a normal reproduction period, at the display rate by one of a frame thinning operation or a frame interpolation operation on the image to make the first frame rate of the image equal to the display rate,
the special reproduction cycle is a sum of the specific special reproduction period and the normal reproduction period,
when the first frame rate of the image is changed to a second frame rate within the special reproduction cycle for the first frame rate, a start time of the special preview process with the second frame rate is set as one of a first start time or a second start time based on a first user operation,
the first start time of the special preview process with the second frame rate is set as a time of the change of the first frame rate of the image to the second frame rate, and
the second start time of the special preview process with the second frame rate is set after an end of the special reproduction cycle for the first frame rate.

2. The display control device according to claim 1, wherein the display control unit is further configured to execute the special reproduction for the specific special reproduction period based on a specific situation change.

3. The display control device according to claim 2, wherein the specific situation change is the change of the first frame rate.

4. The display control device according to claim 3, wherein
the image is subjected to slow reproduction when the first frame rate is changed to a rate larger than the display rate, and
the image is subjected to fast-forward reproduction when the first frame rate is changed to a rate smaller than the display rate.

5. The display control device according to claim 2, wherein the specific situation change is a situation change detected from the image.

6. The display control device according to claim 2, wherein
the specific situation change is a situation change detected from sensor information, and
the sensor information is obtained at a time of capture of the image.

7. The display control device according to claim 2, wherein the display control unit is further configured to:
execute the special reproduction for the specific special reproduction period based on the specific situation change, wherein the specific situation change is different from the change of the first frame rate.

8. The display control device according to claim 7, wherein the display control unit is further configured to execute the special reproduction for the specific special reproduction period, when the specific situation change is different from the change of the first frame rate.

9. The display control device according to claim 7, wherein the specific situation change different from the change of the first frame rate is set based on a second user operation.

10. The display control device according to claim 7, wherein the display control unit is further configured to execute, based on a second user operation, one of:
the special reproduction based on the specific situation change different from the change of the first frame rate, or
each of the special reproduction based on the specific situation change different from the change of the first frame rate and the special preview process based on the change of the first frame rate.

11. The display control device according to claim 1, wherein a target period associated with the special reproduction of the image is set based on a second user operation.

12. The display control device according to claim 1, wherein the specific special reproduction period and the special reproduction cycle are set based on a second user operation.

13. A display control method, comprising:
starting, based on a first frame rate of an image, a special preview process of special reproduction of the image, wherein, in the special preview process, the special reproduction of the image repeats after a special reproduction cycle;
controlling a display device to display the image at a display rate of the imago different from the first frame rate of the image, based on the special reproduction, wherein
the image is displayed at the display rate different from the first frame rate for a specific special reproduction period, and
the first frame rate of the image is variable; and
controlling, in normal reproduction, the display device to display the image at the display rate, wherein
the image is displayed, in the normal reproduction for a normal reproduction period, at the display rate by one of a frame thinning operation or a frame interpolation operation on the image to make the first frame rate of the image equal to the display rate,
the special reproduction cycle is a sum of the specific special reproduction period and the normal reproduction period,
when the first frame rate of the image is changed to a second frame rate within the special reproduction cycle for the first frame rate, a start time of the special preview process with the second frame rate is set as one of a first start time or a second start time based on a user operation,
the first start time of the special preview process with the second frame rate is set as a time of the change of the first frame rate of the image to the second frame rate, and
the second start time of the special preview process with the second frame rate is set after an end of the special reproduction cycle for the first frame rate.

14. A non-transitory computer-readable medium having stored thereon computer-executable instructions that, when executed by a processor, cause the processor to execute operations, the operations comprising:
starting, based on a first frame rate of an image, a special preview process of special reproduction of the image, wherein, in the special preview process, the special reproduction of the image repeats after a special reproduction cycle;
controlling a display device to display the image at a display rate of the imago different from the first frame rate of the image based on the special reproduction, wherein
the image is displayed at the display rate different from the first frame rate for a specific special reproduction period, and
the first frame rate of the image is variable; and
controlling, in normal reproduction, the display device to display the image at the display rate, wherein
the image is displayed, in the normal reproduction for a normal reproduction period, at the display rate by one of a frame thinning operation or a frame interpolation operation on the image to make the first frame rate of the image equal to the display rate,
the special reproduction cycle is a sum of the specific special reproduction period and the normal reproduction period,
when the first frame rate of the image is changed to a second frame rate within the special reproduction cycle for the first frame rate, a start time of the special preview process with the second frame rate is set as one of a first start time or a second start time based on a user operation,
the first start time of the special preview process with the second frame rate is set as a time of the change of the first frame rate of the image to the second frame rate, and
the second start time of the special preview process with the second frame rate is set after an end of the special reproduction cycle for the first frame rate.

* * * * *